(12) United States Patent
Shiraki et al.

(10) Patent No.: US 11,563,361 B2
(45) Date of Patent: *Jan. 24, 2023

(54) CORELESS ROTATING ELECTRICAL MACHINE FOR BEING OPERATED UNDER LOAD EXCEEDING RATING, DRIVING METHOD THEREOF, AND DRIVING SYSTEM INCLUDING THEREOF

(71) Applicant: M-LINK CO., LTD., Yamato (JP)

(72) Inventors: Manabu Shiraki, Yamato (JP); Shuichi Omomo, Yamato (JP)

(73) Assignee: M-LINK CO., LTD., Yamato (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,462

(22) Filed: Jan. 26, 2022

(65) Prior Publication Data

US 2022/0149703 A1    May 12, 2022

Related U.S. Application Data

(63) Continuation of application No. 16/464,036, filed as application No. PCT/JP2016/084856 on Nov. 24, 2016, now Pat. No. 11,251,683.

(51) Int. Cl.
| | |
|---|---|
| *H02K 3/47* | (2006.01) |
| *H02K 9/20* | (2006.01) |
| *H02K 11/25* | (2016.01) |

(52) U.S. Cl.
CPC ............... *H02K 11/25* (2016.01); *H02K 3/47* (2013.01); *H02K 9/20* (2013.01)

(58) Field of Classification Search
CPC .. H02K 3/47; H02K 9/19; H02K 9/20; H02K 11/25
See application file for complete search history.

(56) References Cited

U.S. PATENT DOCUMENTS

| 4,605,874 A | 8/1986 | Whiteley | |
|---|---|---|---|
| 11,251,683 B2 * | 2/2022 | Shiraki | H02K 9/20 |

(Continued)

FOREIGN PATENT DOCUMENTS

| CN | 201230257 Y | 4/2009 |
|---|---|---|
| CN | 105871125 A | 8/2016 |

(Continued)

OTHER PUBLICATIONS

May 28, 2019 International Preliminary Report on Patentability issued in International Patent Application No. PCT/JP2016/084856.

(Continued)

*Primary Examiner* — Eric Johnson
(74) *Attorney, Agent, or Firm* — Oliff PLC

(57) ABSTRACT

A coreless rotating electrical machine for being operated continuously comprises a stator including an energizable coreless cylindrical coil and a lid-type mount; and a rotor including a cup-type mount. The lid-type mount is equipped with a channel for supplying a refrigerant liquid to the air gap. The coreless rotating electrical machine is operated continuously by supplying the refrigerant liquid into the air gap, allowing the cylindrical coil, which generates heat, to vaporize the refrigerant liquid, cooling the cylindrical coil by latent heat of vaporization, and repeating an operation of supplying the refrigerant liquid to prevent a temperature of the cylindrical coil exceeding an allowable maximum temperature, and an operation of adjusting the supply of the refrigerant liquid to prevent the temperature of the cylindrical coil falling below a minimum temperature, so as to maintain the temperature in a range between the allowable maximum and minimum temperatures.

5 Claims, 18 Drawing Sheets

(56) References Cited

U.S. PATENT DOCUMENTS

| | | |
|---|---|---|
| 2002/0171306 A1 | 11/2002 | Graham et al. |
| 2008/0116756 A1 | 5/2008 | Chang et al. |
| 2011/0285252 A1 | 11/2011 | Hyde et al. |
| 2011/0285253 A1 | 11/2011 | Hyde et al. |
| 2011/0285256 A1 | 11/2011 | Hyde et al. |
| 2011/0285339 A1 | 11/2011 | Hyde et al. |
| 2013/0207396 A1 | 8/2013 | Tsuboi |
| 2016/0099633 A1 | 4/2016 | Yoshinori et al. |
| 2017/0288489 A1 | 10/2017 | Shiraki et al. |
| 2018/0080719 A1 | 3/2018 | Levy |

FOREIGN PATENT DOCUMENTS

| | | |
|---|---|---|
| JP | S60/31167 U | 3/1985 |
| JP | S60/162959 U | 10/1985 |
| JP | H05-308752 A | 11/1993 |
| JP | H06-217496 A | 8/1994 |
| JP | H08-130856 A | 5/1996 |
| JP | 2667524 B2 | 10/1997 |
| JP | H10-336968 A | 12/1998 |
| JP | 2004-48883 A | 2/2004 |
| JP | 2006-14522 A | 1/2006 |
| JP | 2006-74962 A | 3/2006 |
| JP | 2006-158105 A | 6/2006 |
| JP | 2009-118686 A | 5/2009 |
| JP | 2009-118693 A | 5/2009 |
| JP | 2011-93424 A | 5/2011 |
| JP | 2012-523817 A | 10/2012 |
| JP | 2013-526826 A | 6/2013 |
| JP | 2014-17968 A | 1/2014 |
| JP | 2015-95961 A | 5/2015 |
| JP | 5911033 B1 | 4/2016 |
| JP | 2016-77117 A | 5/2016 |
| TW | 2013-28140 A | 7/2013 |
| WO | 2016/035358 A1 | 3/2016 |

OTHER PUBLICATIONS

Jan. 24, 2017 International Search Report issued in PCT/JP2016/084856.

Aug. 20, 2019 Office Action issued in Korean Patent Application No. 10-2019-7012334.

Oct. 18, 2019 Office Action issued in Chinese Patent Application No. 201680091120.4.

Feb. 26, 2020 Office Action issued in Taiwanese Patent Application No. 106140222.

* cited by examiner

| Torque Nm | Current Arms | Rotational speed rpm | Output W | Pump conveying amount ml/min | Total pump operation time @ 10 sec sec | Refrigerant amount @ 10 min ml | Note |
|---|---|---|---|---|---|---|---|
| 0.28 | 9.7 | 6537 | 181.67 | 0 | 0 | 0 | Without cooling, temperature of coil 127 °C @ 720s |
| 0.33 | 11.2 | 6255 | 216.16 | 3.88 | 36 | 2.82 | |
| 0.36 | 12.1 | 6049 | 228.04 | 3.88 | 85.5 | 5.53 | |
| 0.39 | 12.9 | 5860 | 239.33 | 3.88 | 128 | 8.28 | |
| 0.42 | 13.8 | 5688 | 250.17 | 3.88 | 176.5 | 11.41 | |

| Substance | Melting temperature °C | Boiling temperature °C | Vaporization heat kJ/kg |
|---|---|---|---|
| Water | 0 | 100 | 2257 |
| Ethanol | −114.5 | 78.32 | 838 |
| Ammonia | −77.7 | −33.48 | 1372 |
| Liquid nitrogen | −209.86 | −195.8 | 199 |
| Liquid helium | −272.2 | −268.9 | 20.4 |
| Fluorinated liquid (3M™ Novec™ 7000) | −123 | 34 | 142 |

CORELESS ROTATING ELECTRICAL MACHINE FOR BEING OPERATED UNDER LOAD EXCEEDING RATING, DRIVING METHOD THEREOF, AND DRIVING SYSTEM INCLUDING THEREOF

CROSS-REFERENCE

This application is a Continuation of U.S. patent application Ser. No. 16/464,036, filed May 24, 2019, which is a National Stage Entry of International Application No. PCT/JP2016/084856, filed Nov. 24, 2016. The entire content of each of the prior applications is hereby incorporated by reference.

TECHNICAL FIELD

The present invention relates to a coreless rotating electrical machine for being operated under a load exceeding a rating, a driving method thereof, and a driving system including thereof.

More specifically, the present invention relates to a coreless rotating electrical machine, a driving method thereof, and a driving system including thereof, in which an air space including an air gap is formed by a stator consisting of a lid-type mount which fixes an end face of an energizable coreless cylindrical coil and a rotor consisting of a cylindrical or cup-type mount opposingly and rotatably positioned with respect to the lid-type mount with a plurality of magnets equipped on an inner surface of the cylindrical mount, and when it is to be operated under the load exceeding the rating, such operation is enabled by adjusting supply amount of the refrigerant liquid so that the temperature of the cylindrical coil does not exceed the allowable maximum temperature at a rated operation, in which the refrigerant liquid is supplied to the air space to allow the cylindrical coil, which generates heat, to vaporize the refrigerant liquid so as to cool itself by latent heat of vaporization of the refrigerant liquid.

BACKGROUND ART

An electric motor and an electric generator are both a rotating electrical machine having a same structure. Descriptions are made for the rotating electrical machine using the electric motor which converts electrical energy to kinetic energy. The electric motor outputs electromagnetic power generated by an interaction of a magnetic field and electricity. There are various methods of classification, but generally they are classified as a DC motor with brush or a brushless motor, wherein the former uses a magnet as a stator, coil as a rotor, and conversely, the latter uses a coil as a stator, a magnet as a rotor, and each of them is what outputs electromagnetic power to outside from the rotor. On the other hand, the electric motor is also classified as a winding-field type or a permanent-magnet type depending on a difference in generating the magnetic field, and is also classified based on whether a coil is with or without a core. According to the classification described in the above, the subject of the present invention is a permanent-magnet field type coreless brushless electric motor.

The present invention relates to a coreless brushless motor consisting of a permanent-magnet field type coreless cylindrical coil. The coreless cylindrical coil of a stator is either made with a laminate of electrically conductive metal sheets having linear parts covered with insulating layers, or made with a linear conductor covered with an insulating layer.

The electric motor may momentarily exceed a rated current at start-up, but it is not assumed to be continuously operated under a condition exceeding a rating. When the electric motor is continuously operated under an overload condition, that is, continuously operated above the rating, the cylindrical coil of the electric motor generates heat more than assumed by electric current applied.

Though it depends on structures and functions of the electric motor, when overload tests are performed under each of conditions exceeding the rating, using a coreless motor (CP50) manufactured as a test motor related to the present invention, without activating a controlling part of a refrigerant liquid supply, an allowable maximum temperature of the cylindrical coil, which is 130° C., is exceeded in only a few tens of seconds, as described in the followings. The worst state which may be easily assumed to be caused from the above is that the cylindrical coil burns out and be destructed. Even if the cylindrical coil does not result in destruction, it is no longer possible to expect a normal long-time operation of the coreless motor in the context of performance. It has been well-known without mentioning, and it is merely a commonly used means to add a cooling function to the electric motor in order to prevent a decrease in performance of the electric motor accompanied with heat generation of the cylindrical coil and/or heating of the magnet.

In spite of existence and non-existence of such cooling function, a maximum temperature limit for a coil and/or magnets during a normal operation of an electric motor is shown as a rating from a manufacturer (page 41 of Non-Patent Document 1). The rating is a unique standard guaranteed by the manufacturer, and is described in catalogs and/or specifications. It means that, for example, the maximum output from the motor at a predetermined voltage, with the motor exerting a good property, becomes a rated output, a rotating speed when operated under the rated output is a rated rotating speed, a torque T at such time is a rated torque, and a current at such time is a rated current. When usage is not specified, a continuous rating which allows an operation for an indefinite period of time is provided as the rating. As other ratings, there are a short-time rating in which an operational period is limited and/or an intermittent-service rating in which an operation is repeatedly made on and off periodically etc.

The present invention relates to a coreless motor for being operated under a load exceeding a rating, which is developed based on an idea of enabling a constant operation under overload. The term "rating" described herein refers to, for example, a rating when the coreless motor is operated at a predetermined voltage under a rated torque or a rated output.

In this regard, the coreless motor (CP50) manufactured as a test motor is a so-called electric motor. While details will be described in the followings, conditions of the rating described here are that, a continuous operation is performed with the refrigerant supply amount being zero, and without activating the controlling part of the refrigerant supply, and also that the temperature of the cylindrical coil does not exceed the allowable maximum temperature which is 130° C., wherein the rated torque is $T_0=0.28$ Nm, the rated current is $I_0=9.7$ Arms, the rated rotating speed is $n_0=6537$ rpm and the rated output is $P_0=191.67$ W (FIG. 11).

Next, it has been well-known to add a cooling function to an electric motor in order to prevent decrease in performance of the electric motor accompanied with heat generation of a cylindrical coil and/or heating of a magnet. This is appreciated from the following conventional techniques.

Patent Document 1 (PCT Japanese Publication: JP2012-523817A) describes as that, a diffusive material is disposed around coils, which absorbs a liquid coolant having a boiling point below a working temperature of the coils to make the coil wet so that the coils are cooled by heat of vaporization of the boiled liquid coolant.

Patent Document 2 (Japanese Laid-Open Patent Publication H10-336968A) describes a system, including a radiator, configured such that a centrifugal pump action of a rotor and height difference are used for refrigerant circulation of a gas-liquid two-phase so that inside of a rotating electrical appliance for vehicle is cooled.

Patent Document 3 (Japanese Laid-Open Patent Publication 2006-14522A) describes storing a refrigerant, which temperature of a boiling point is lower than an allowable maximum temperature, in an electric generator, and efficiently cooling the electric generator while alternatively repeating vaporizing of the refrigerant and devolatilizing of the refrigerant inside the electric generator during operation of the electric generator.

Patent Document 4 (Japanese Laid-Open Patent Publication 2006-158105A) describes evaporating a coolant in a liquid phase in an auto-circulating path including a reservoir tank of the coolant with heat generated from a rotor to allow for efficient cooling with the evaporated coolant.

Patent Document 5 (Japanese Laid-Open Patent Publication 2009-118693A) describes a method for cooling a rotor with latent heat of vaporization, in which, in a rotor cooling apparatus, a refrigerant is continuously supplied little by little toward a cooling wall surface of the rotor such that the refrigerant may not be located eccentrically on the wall.

Patent Document 6 (Japanese Laid-Open Patent Publication 2015-95961A) describes a cooling structure of a motor in which, in a sealed case of the motor, a refrigerant included in the case is vaporized by heat of a coil of a stator, devolatilized in a heat releasing part and circulated in the sealed case. This cooling structure is common with what are described in Patent Documents 3 and/or 4.

Patent Document 7 (Japanese Laid-Open Patent Publication 2009-118686A) describes a cooling structure of a rotating electrical appliance in which a refrigerant distribution channel for cooling magnets and that for cooling a coil is respectively provided, and the channels are arranged with a switchable means.

Patent Document 8 (Japanese Laid-Open Patent Publication 2014-17968A) describes a cooling system of a rotating electrical appliance mounted on a hybrid vehicle. The rotating electrical appliance comprises a coil part which winds around a stator core formed by laminating a plurality of electromagnetic steel plates. The cooling system of the rotating electrical apparatus having an iron core disclosed therein is configured such that, when a temperature of windings of the coil part exceeds 180° C. for more than 10 times, an insulated covering around the windings of the coil part evaporates or vaporizes and be dissipated to result in a decrease in performance for withstanding discharge pressure, and thus, a controlling part is equipped for adjusting supply amount of a refrigerant to form a state where the refrigerant is adhered around the windings of a specific portion so as to prevent such decrease in performance.

Patent Document 9 (Japanese Laid-Open Patent Publication H06-217496A) describes an electric generator in which an evaporative condensation room is provided inside a rotor of the electric generator, a cooling liquid is fed with a jet stream from outside in an axial direction, and an impeller for waste liquid is provided in a liquid room connected with a cooling liquid room which uses centrifugal force to deflect the cooling liquid to the evaporative condensation room side to make it flow.

Patent Document 10 (Japanese Laid-Open Patent Publication H05-308752A) describes a radiating structure of a motor placed in a housing where a rotor and an annular stator surrounding the rotor are in an air tight state, in which a pipe in communication with an annular cavity in the housing to which a working fluid is included, and a Whitworth having a capillary action are arranged.

Patent Document 11 (Japanese Laid-Open Patent Publication H08-130856A) describes a cooling circuit, in which, in a driving device motor for electric vehicle consisting of a coil winded on a cylindrical core, oil is dropped on a coil end from a cooling oil pump via a cooling oil injection part.

CITATION LIST

Patent Documents

Patent Document 1: PCT Japanese Publication: JP2012-523817A
Patent Document 2: Japanese Laid-Open Patent Publication H10-336968A
Patent Document 3: Japanese Laid-Open Patent Publication 2006-14522A
Patent Document 4: Japanese Laid-Open Patent Publication 2006-158105A
Patent Document 5: Japanese Laid-Open Patent Publication 2009-118693A
Patent Document 6: Japanese Laid-Open Patent Publication 2015-95961A
Patent Document 7: Japanese Laid-Open Patent Publication 2009-118686A
Patent Document 8: Japanese Laid-Open Patent Publication 2014-17968A
Patent Document 9: Japanese Laid-Open Patent Publication H06-217496A
Patent Document 10: Japanese Laid-Open Patent Publication H05-308752A
Patent Document 11: Japanese Laid-Open Patent Publication H08-130856A Non-Patent Documents Non-Patent Document 1: "Best Colored Illustration, All of Current Motor Technology", Edited by Kan Akatsu, Natsume Publishing Planning Co., Ltd. (Published on Jul. 20, 2013)

SUMMARY OF INVENTION

Technical Problem

A technical problem inherent in an electric motor, which is rotated by electromagnetic action of components such as a stator and a rotor, is heat generation action of a coil which is an armature equipped, on the stator. Performance and/or size of the electric motor are generally represented by output of the electric motor. The output $P_O$ is represented by the product of rotating speed n (rpm) and torque T (N·m). Provided that input power of the electric motor is $P_1$(W), a difference between the input power $P_1$ and the output $P_O$ is converted to heat energy as heat loss $P_L$ and discharged to the environment. This is the heat generation action of the armature coil, and is the technical problem of the electric motor which is difficult to be avoided. For example, not applied only to a coreless motor, it has been a well-known matter for those skilled in the art that, when the electric motor is continued to be operated under the load exceeding the rating, an allowable maximum temperature of the armature coil is exceeded in a short time due to such heat generation action, resulting in burnout and destruction. There is also a problem inherent in the electric motor that the heat generation action of the armature coil raises a resistance value of the armature coil, and evokes output fluctuation of the electric motor, and thus, it is also an ultimate technical problem of the electric motor to completely control the temperature of the armature coil in a certain range so as to minimize the output fluctuation.

The problem may be solved by finding a way to control the temperature of the armature coil. Various proposals as described in the above have been made to address the problem but have not led to a fundamental solution for the ultimate problem of completely controlling the temperature of the armature coil in the certain range.

Solution to Problem

However, the inventors have challenged to develop an electric motor based on the idea of enabling the constant operation under overload, and realized a coreless rotating electrical machine for being operated under a load exceeding a rating, a method for driving thereof, and a driving system including thereof, and came up with solving the technical problem. This can be confirmed from driving tests using a coreless motor (CP50) manufactured based on one embodiment of the present invention.

The voltage of the coreless motor (CP50) is set to 24 V, and measured the torque. This is the rated torque $T_0$=0.28 Nm. The inventors of the present invention have confirmed that a long time operation of the coreless motor (CP50) is possible by completely controlling the heat generation of the cylindrical coil, which is the armature coil, with a load exceeding the rated torque $T_0$ being continuously applied to the coreless motor (CP50).

The first aspect of the present invention is a coreless rotating electrical machine 10 for being operated under a load exceeding a rating, shown in a cross sectional schematic diagram of FIG. 1 and a broken perspective diagram of FIG. 2.

It is the coreless rotating electrical machine 10 in which an air space 40 including an air gap is formed by a stator 2 consisting of a lid-type mount 200 which fixes an end face 101 of an energizable coreless cylindrical coil 100 and a rotor 3 consisting of a cylindrical mount 300 opposingly and rotatably positioned with respect to the lid-type mount 200 with a plurality of magnets 4 equipped on an inner surface 310 of the cylindrical mount 300; a channel 8 for supplying a refrigerant liquid 80 to the air space 40 is provided on the stator 2; and a controlling part 20 related to the stator 2 and a driving part 30 related to the rotor 3 are equipped therewith.

It can also be equipped, on the stator 2, with a refrigerant liquid container 81 which is in communication with the channel 8, and a circulating means 82 which communicates between the refrigerant liquid container 81 and the air space 40.

As apparent from the first aspect of the present invention, the coreless rotating electrical machine 10 is characterized in that, the driving part 30 is activated, and when it is to be operated under the load exceeding the rating, such operation is enabled by activating the controlling part 20 to adjust supply amount of the refrigerant liquid 80 so that the temperature of the cylindrical coil 100 does not exceed the allowable maximum temperature $t_M$ at a rated operation, in which the refrigerant liquid 80 is supplied to the air space 40 to allow the cylindrical coil 100, which generates heat, to vaporize the refrigerant liquid 80 so as to cool itself by latent heat of vaporization of the refrigerant liquid 80.

As one embodiment of the present invention, it is more preferable that, when the coreless rotating electrical machine 10 is operated under the load exceeding the rating, an operation of activating the controlling part 20 to adjust supply amount of the refrigerant liquid 80 so that the temperature of the cylindrical coil 100 does not exceed the allowable maximum temperature $t_M$, and an operation to stop supplying of the refrigerant liquid 80 to the air space 40 so that the temperature of the cylindrical coil 100 at least does not fall below the minimum temperature $t_N$ where the refrigerant liquid 80 vaporizes by the above operation are repeated so as to maintain the temperature of the cylindrical coil 100 in a range between the allowable maximum temperature $t_M$ and the minimum temperature $t_N$.

As another embodiment of the present invention, as shown in a schematic diagram of FIG. 5, the controlling part 20 may comprise a coil temperature detecting sensor 21 for detecting a temperature of the cylindrical coil 100, a pump 22 for supplying the refrigerant liquid 80 to the air space 40 in coordination with the coil temperature detecting sensor 21, and a controller 23 for adjusting supply amount of the refrigerant liquid 80 with on/off command to the pump 22.

As a further embodiment of the present invention, as shown in a schematic diagram of FIG. 6, the controlling part 20 may comprise a coil temperature detecting sensor 21 for detecting a temperature of the cylindrical coil 100, an electromagnetic valve 24 for supplying the refrigerant liquid 80 to the air space 40 from the refrigerant liquid container 81 arranged at a position higher than the cylindrical coil 100, in coordination with the coil temperature detecting sensor 21, and a controller 23 for adjusting supply amount of the refrigerant liquid 80 with open/close command to the electromagnetic valve 24.

As another embodiment of the present invention, as shown in FIG. 5 or FIG. 6, the controlling part 20 may be configured such that the refrigerant liquid 80 in a gas phase 800 is collected in a liquid phase 80 into the refrigerant liquid container 81 by a circulating means 82.

As a further embodiment of the present invention, as shown in FIGS. 1 and 2, the coreless rotating electrical machine 10 may be configured such that a drive shaft 1000 is equipped as being fixed to a center part 340 of the cylindrical mount 300, and rotatably coupled to a center part 240 of the lid-type mount 200.

The second aspect of the present invention is a coreless rotating electrical machine 10 for being operated under a load exceeding a rating shown in a cross sectional schematic diagram of FIG. 3 and a broken perspective diagram of FIG. 4.

It forms a first air space 40 including an air gap by a stator 2 consisting of a lid-type mount 200 which fixes one of end faces 101 of an energizable coreless cylindrical coil 100, and a rotor 3 consisting of a cup-type mount 400 opposingly and rotatably positioned with respect to the lid-type mount 200, wherein the cup-type mount 400 included in the rotor 3 has a bottom part 410 open at one end and closed at the other end, to which concentric inner yoke 420 and outer yoke 430 are integrated, and the rotor is equipped with a plurality of magnets 4 with intervals 41 with respect to each other in a circumferential direction on an outer surface 422 of the inner yoke 420 and/or an inner surface 431 of the outer yoke 430, and provided with slits 423, each of which passing through the inner yoke 420, at positions of the inner yoke 420 corresponding to each of the intervals 41.

Further, it is the coreless rotating electrical machine 10 for being operated under the load exceeding the rating, in which the cylindrical coil 100 is arranged in a first air space 40 as suspended such that the other end face 102 of the cylindrical coil 100 leaves a clearance 411 between the bottom 410 of the cup-type mount 400; a second air space 50 is formed between one of end faces 401 of the cup-type mount 400 and the lid-type mount 200 at an inner periphery side 110 of the cylindrical coil 100; a third air space 60 is formed at an outer periphery side 120 of the cylindrical coil 100; a channel 8 for supplying a refrigerant liquid 80 to the first air space 40 is provided on the stator 2; and a controlling part 20 related to the stator 2, and a driving part 30 related to the rotor 3 are equipped therewith.

It also can be equipped, on the stator 2, with a refrigerant liquid container 81 which is in communication with a channel 8, and further equipped with a circulating means 82 which communicates between the refrigerant liquid container 81 and the first air space 40.

As apparent from the second aspect of the present invention, the coreless rotating electrical machine 10 is characterized in that, the driving part 30 is activated, and when it is to be operated under the load exceeding the rating, such operation is enabled by activating the controlling part 20 to adjust supply amount of the refrigerant liquid 80 so that the temperature of the cylindrical coil 100 does not exceed the allowable maximum temperature $t_M$ at a rated operation, in which the refrigerant liquid 80 is supplied to inside 421 of the inner yoke 420 of the first air space 40 to allow the cylindrical coil 100, which generates heat, to vaporize the refrigerant liquid 80 fed to the cylindrical coil 100 via the slits 423 so as to cool itself by latent heat of vaporization of the refrigerant liquid 80.

As one embodiment of the present invention, it is more preferable that, when the coreless rotating electrical machine 10 is operated under the load exceeding the rating, an operation of activating the controlling part 20 to adjust supply amount of the refrigerant liquid 80 so that the temperature of the cylindrical coil 100 does not exceed the allowable maximum temperature $t_M$, and an operation of stop supplying of the refrigerant liquid 80 to the air space 40 so that the temperature of cylindrical coil 100 does not fall below the allowable minimum temperature $t_N$ where the refrigerant liquid 80 vaporizes by the above operation are repeated so as to maintain the temperature of the cylindrical coil 100 in a range between the allowable maximum temperature $t_M$ and the allowable minimum temperature $t_N$.

As another embodiment of the present invention, as shown in a schematic diagram of FIG. 5, the controlling part 20 may comprise a coil temperature detecting sensor 21 for detecting a temperature of the cylindrical coil 100, a pump 22 for supplying the refrigerant liquid 80 to inside 421 of the inner yoke 420 of the first air space 40 in coordination with the coil temperature detecting sensor 21, and a controller 23 for adjusting the supply amount of the refrigerant liquid 80 with on/off command to the pump 22.

As a further embodiment of the present invention, as shown in a schematic diagram of FIG. 6, the controlling part 20 may comprise a coil temperature detecting sensor 21 for detecting a temperature of the cylindrical coil 100, an electromagnetic valve 24 for supplying the refrigerant liquid 80 to inside 421 of the inner yoke 420 of the first air space 40 from the refrigerant liquid container 81 arranged at a position higher than the cylindrical coil 100, in coordination with the coil temperature detecting sensor 21, and a controller 23 for adjusting supply amount of the refrigerant liquid 80 with open/close command to the electromagnetic valve 24.

As another embodiment of the present invention, as shown in FIG. 5 of FIG. 6, the controlling part 20 may be configured such that the refrigerant liquid 80 in a gas phase 800 is collected in a liquid phase 80 into the refrigerant liquid container 81 by a circulating means 82.

As a further embodiment of the present invention, as shown in FIGS. 3 and 4, the coreless rotating electrical machine 10 may be configured such that a drive shaft 1000 is equipped as being fixed to a center part 340 of the cup-type mount 400, and rotatably coupled to a center part 240 of the lid-type mount 200.

As one embodiment in the first and second aspects of the present invention, it is preferred that the cylindrical coil 100 is made from what formed to a cylindrical form by either of a laminate of electrically conductive metal sheets having linear parts being spaced in an axial direction covered with insulating layers, or a linear conductor covered with an insulating layer.

As another embodiment in the first and second aspects of the present invention, it is preferred that the refrigerant liquid 80 is any of water, ethanol, ammonia, liquid nitrogen, liquid helium or fluorinated liquid.

The third aspect of the present invention is a driving method of a coreless rotating electrical machine 10 for being operated under a load exceeding a rating, shown in FIG. 1 and FIG. 2.

It is the driving method of the coreless rotating electrical machine 10 for being operated under a load exceeding a rating, in which an air space 40 including an air gap is formed by a stator 2 consisting of a lid-type mount 200 which fixes an end face 101 of an energizable coreless cylindrical coil 100 and a rotor 3 consisting of a cylindrical mount 300 opposingly and rotatably positioned with respect to the lid-type mount 200 with a plurality of magnets 4 equipped on an inner surface 310 of the cylindrical mount 300; a channel 8 for supplying a refrigerant liquid 80 to the air space 40 is provided on the stator 2; and a controlling part 20 related to the stator 2 and a driving part 30 related to the rotor 3 are equipped therewith.

Further, in the driving method of the present invention, the coreless rotating electrical machine 10 can also be equipped, on the stator 2, with a refrigerant liquid container 81 which is in communication with the channel 8, and a circulating means 82 which communicates between the refrigerant liquid container 81 and the air space 40.

As apparent from the third aspect of the present invention, the method is characterized in that it comprises: a step of activating the driving part 30 and operating the coreless rotating electrical machine 10 under the load exceeding the rating; a step of activating the controlling part 20 to supply the refrigerant liquid 80 to the air space 40; a step of allowing the cylindrical coil 100, which generates heat, to vaporize the refrigerant liquid 80 so as to cool itself by latent heat of vaporization of the refrigerant liquid 80; and a step of adjusting supply amount of the refrigerant liquid 80 so that the temperature of the cylindrical coil 100 does not exceed the allowable maximum temperature $t_M$ at a rated operation.

As one embodiment of the present invention, further, it is more preferable to comprise a step of activating the controlling part 20 to stop supplying of the refrigerant liquid 80 to the air space 40 so that the temperature of the cylindrical coil 100 at least does not fall below the minimum temperature $t_N$ where the refrigerant liquid 80 vaporizes, and further comprise a step of repeating the above step and the step of supplying the refrigerant liquid 80 to the air space 40 so as to maintain the temperature of the cylindrical coil 100 in a range between the allowable maximum temperature $t_M$ and the minimum temperature $t_N$.

As another embodiment of the present invention, it may be the driving method, in which, as shown in FIG. 5, the controlling part 20 further comprises a coil temperature detecting sensor 21 for detecting a temperature of the cylindrical coil 100, a pump 22 for supplying the refrigerant liquid 80, and a controller 23 for adjusting supply amount of the refrigerant liquid 80 with on/off command to the pump 22, and the method comprises a step of activating the coil temperature detecting sensor 21 to detect a temperature of the cylindrical coil 100, a step of having the controller 23 activate the pump 22 in coordination with the above step to supply the refrigerant liquid 80 to the air space 40, and a step of adjusting supply amount of the refrigerant liquid 80.

As a further embodiment of the present invention, it also may be the driving method, in which, as shown in FIG. 6, the controlling part 20 comprises a coil temperature detecting sensor 21 for detecting a temperature of the cylindrical coil 100, an electromagnetic valve 24 for supplying the refrigerant liquid 80 to the air space 40 from the refrigerant liquid container 81 arranged at a position higher than the cylindrical coil 100, in coordination with the coil temperature detecting sensor 21, and a controller 23 for adjusting supply amount of the refrigerant liquid 80 with open/close command to the electromagnetic valve 24, and the method comprises a step of activating the coil temperature detecting sensor 21 to detect a temperature of the cylindrical coil 100, a step of having the controller 23 activate the electromagnetic valve 24 in coordination with the above step to supply the refrigerant liquid from the refrigerant liquid container 81 to the air space 40, and a step of adjusting supply amount of the refrigerant liquid 80.

As another embodiment of the present invention, further, as shown in FIG. 5 or FIG. 6, it also may be the driving method which further comprises a step of having the controlling part 20 activate the circulating means 82 to collect the refrigerant liquid 80 in a gas phase 800 into the refrigerant liquid container 81 in a liquid phase 80 thereof.

As another embodiment of the present invention, further, it also may be the driving method of the coreless rotating electrical machine 10 in which a drive shaft 1000 is fixed to a center part 340 of the cylindrical mount 300, and rotatably coupled to a center part 240 of the lid-type mount 200.

The fourth aspect of the present invention is a driving method of a coreless rotating electrical machine 10 for being operated under a load exceeding a rating, shown in FIG. 3 and FIG. 4.

The coreless rotating electrical machine 10 forms a first air space 40 including an air gap by a stator 2 consisting of a lid-type mount 200 which fixes one of end faces 101 of an energizable coreless cylindrical coil 100, and a rotor 3 consisting of a cup-type mount 400 opposingly and rotatably positioned with respect to the lid-type mount 200, wherein the cup-type mount 400 included in the rotor 3 has a bottom part 410 open at one end and closed at the other end, to which concentric inner yoke 420 and outer yoke 430 are integrated, and the rotor is equipped with a plurality of magnets 4 with intervals 41 with respect to each other in a circumferential direction on an outer surface 422 of the inner yoke 420 and/or an inner surface 431 of the outer yoke 430, and provided with slits 423, each of which passing through the inner yoke 420, at positions of the inner yoke 420 corresponding to each of the intervals 41.

Further, it is the driving method for operating the coreless rotating electrical machine 10 under the load exceeding the rating, in which the cylindrical coil 100 is arranged in a first air space 40 as suspended such that the other end face 102 of the cylindrical coil 100 leaves a clearance 411 between the bottom 410 of the cup-type mount 400; a second air space 50 is formed between one of end faces 401 of the cup-type mount 400 and the lid-type mount 200 at an inner periphery side 110 of the cylindrical coil 100; a third air space 60 is formed at an outer periphery side 120 of the cylindrical coil 100; a channel 8 for supplying a refrigerant liquid 80 to the first air space 40 is provided on the stator 2, and a controlling part 20 related to the stator 2, and a driving part 30 related to the rotor 3 are equipped therewith.

Further, in the driving method of the present invention, the coreless rotating electrical machine 10 can be equipped, on the stator 2, with a refrigerant liquid container 81 which is in communication with a channel 8, and further equipped with a circulating means 82 which communicates between the refrigerant liquid container 81 and the first air space 40.

As apparent from the fourth aspect of the present invention, the method is characterized in that it comprises a step of activating the driving part 30 and operating the coreless rotating electrical machine 10 under the load exceeding the rating, a step of activating the controlling part 20 to supply the refrigerant liquid 80 to inside 421 of the inner yoke 420 of the first air space 40 so as to feed the refrigerant liquid 80 to the cylindrical coil 100, which generates heat, via the slits 423, a step of allowing the cylindrical coil 100, which generates heat, to vaporize the refrigerant liquid 80 so as to cool itself by latent heat of vaporization of the refrigerant liquid 80, and a step of adjusting supply amount of the refrigerant liquid 80 so that the temperature of the cylindrical coil 100 does not exceed the allowable maximum temperature $t_M$ at a rated operation.

As one embodiment of the present invention, further, it is preferable to comprise a step of activating the controlling part 20 to stop supplying of the refrigerant liquid 80 to the first air space 40 so that the temperature of the cylindrical coil 100 at least does not fall below the minimum temperature $t_N$ where the refrigerant liquid 80 vaporizes, and further comprise a step of repeating the above step and the step of supplying the refrigerant liquid 80 to inside 421 of the inner yoke 420 of the first air space 40 so as to feed the refrigerant liquid 80 to the cylindrical coil 100, which generates heat, via the slits 423 so as to maintain the temperature of the cylindrical coil 100 in a range between the allowable maximum temperature $t_M$ and the minimum temperature $t_N$.

As another embodiment of the present invention, it may be the driving method, in which as shown in a schematic diagram of FIG. 5, the controlling part 20 further comprises a coil temperature detecting sensor 21 for detecting a temperature of the cylindrical coil 100, a pump 22 for supplying the refrigerant liquid 80, and a controller 23 for adjusting supply amount of the refrigerant liquid 80 with on/off command to the pump 22, and the method comprises a step of activating the coil temperature detecting sensor 21 to detect a temperature of the cylindrical coil 100, a step of having the controller 23 activate the pump 22 in coordination with the above step to supply the refrigerant liquid 80 to inside 421 of the inner yoke 420 of the first air space 40 so as to feed the refrigerant liquid 80 to the cylindrical coil 100, which generates heat, via the slits 423, and a step of adjusting supply amount of the refrigerant liquid 80.

As a further embodiment of the present invention, it also may be the driving method, in which, as shown in a schematic diagram of FIG. 6, the controlling part 20 comprises a coil temperature detecting sensor 21 for detecting a temperature of the cylindrical coil 100, an electromagnetic valve 24 for supplying the refrigerant liquid 80 to the first air space 40 from the refrigerant liquid container 81 arranged at a position higher than the cylindrical coil 100, in coordination with the coil temperature detecting sensor 21, and a controller 23 for adjusting supply amount of the refrigerant liquid 80 with open/close command to the electromagnetic valve 24, and the method comprises a step of activating the coil temperature detecting sensor 21 to detect a temperature of the cylindrical coil 100, a step of having the controller 23 activate the electromagnetic valve 24 in coordination with the above step to supply the refrigerant liquid 80 to inside 421 of the inner yoke 420 of the first air space 40 so as to feed the refrigerant liquid 80 to the cylindrical coil 100, which generates heat, via the slits 423, and a step of adjusting supply amount of the refrigerant liquid 80.

As another embodiment of the present invention, further, as shown in FIG. 5 or FIG. 6, it may be the driving method which further comprises a step of having the controlling part 20 activate the circulating means 82 to collect the refrigerant liquid 80 in a gas phase 800 into the refrigerant liquid container 81 in a liquid phase 80.

As another embodiment of the present invention, further, it also may be the driving method of the coreless rotating electrical machine 10 in which a drive shaft 1000 is fixed to a center part 440 of the cup-type mount 400, and rotatably coupled to a center part 240 of the lid-type mount 200.

As one embodiment in the third and fourth aspects of the present invention, it is preferred that the cylindrical coil 100 is made from what formed to a cylindrical form by either of a laminate of electrically conductive metal sheets having linear parts being spaced in an axial direction covered with insulating layers, or a linear conductor covered with an insulating layer.

As another embodiment in the third and fourth aspects of the present invention, it is preferred that the refrigerant liquid 80 is any of water, ethanol, ammonia, liquid nitrogen, liquid helium or fluorinated liquid.

The fifth aspect of the present invention is a driving system 1 for operating a coreless rotating electrical machine 10 under a load exceeding a rating, wherein the coreless rotating electrical machine 10 is shown by each of the schematic diagrams of FIGS. 1 and 2, and the driving system 1 is shown by each of the schematic diagrams of FIGS. 5 and 6.

It is the driving system 1 for operating the coreless rotating electrical machine 10 under a load exceeding a rating, wherein the driving system consists of the coreless rotating electrical machine 10 in which an air space 40 including an air gap is formed by a stator 2 consisting of a lid-type mount 200 which fixes an end face 101 of the energizable coreless cylindrical coil 100 and a rotor 3 having a cylindrical mount 300 opposingly and rotatably positioned with respect to the lid-type mount 200 with a plurality of magnets 4 equipped on an inner surface 310 of the cylindrical mount 300, and having a channel 8 for supplying refrigerant liquid 80 to the air space 40, provided on the stator 2; a driving device 30 which is activated in coordination with the rotor 3 to drive the coreless rotating electrical machine 10; and a controlling device 20 which supplies the refrigerant liquid 80 to the air space 40 in coordination with a coil temperature detecting sensor 21 which detects a temperature of the cylindrical coil 100, equipped on the stator 2.

Further, in the driving system 1 of the present invention, the coreless rotating electrical machine 10 can also be equipped, on the stator 2, with a refrigerant liquid container 81 which is in communication with the channel 8, and a circulating means 82 which communicates between the refrigerant liquid container 81 and the first air space 40.

As apparent from the fifth aspect of the present invention, the driving system 1 is characterized in that, when activating the driving part 30 and operating the coreless rotating electrical machine 10 under the load exceeding the rating, such operation is enabled by activating the controlling part 20 to adjust supply amount of the refrigerant liquid 80 so that the temperature of the cylindrical coil 100 does not exceed the allowable maximum temperature $t_M$ at a rated operation, in which the refrigerant liquid 80 is supplied to the air space 40 to allow the cylindrical coil 100, which generates heat, to vaporize the refrigerant liquid 80 so as to cool itself by latent heat of vaporization of the refrigerant liquid 80.

As one embodiment of the present invention, it is more preferable that, when the driving system 1 operates the coreless rotating electrical machine 10 under the load exceeding the rating, an operation of activating the controlling device 20 to supply the refrigerant liquid 80 to the air space 40 so that the temperature of the cylindrical coil 100 does not exceed the allowable maximum temperature $t_M$ at a rated operation, and an operation to stop supplying of the refrigerant liquid 80 to the air space 40 so that the temperature of the cylindrical coil 100 at least does not fall below the minimum temperature $t_N$ where the refrigerant liquid 80 vaporizes by the above operation are repeated so as to maintain the temperature of the cylindrical coil 100 in a range between the allowable maximum temperature $t_M$ and the minimum temperature $t_N$.

As another embodiment of the present invention, as shown in FIG. 5, it may be the driving system 1 in which the controlling device 20 comprises a pump 22 for supplying the refrigerant liquid 80, and a controller 23 for adjusting supply amount of the refrigerant liquid 80 with on/off command to the pump 22, wherein the controller 23 activates the pump 22 in coordination with the coil temperature detecting sensor 21 so as to supply the refrigerant liquid 80 to the air space 40 and also to adjust supply amount of the refrigerant liquid 80.

As a further embodiment of the present invention, it may be the driving system 1, as shown in FIG. 6, in which the controlling device 20 comprises an electromagnetic valve 24 for supplying the refrigerant liquid 80 and a controller 23 for adjusting supply amount of the refrigerant liquid 80 with open/close command to the electromagnetic valve 24, wherein the electromagnetic valve 24 is activated in coordination with the coil temperature detecting sensor 21 to supply the refrigerant liquid 80 to the air space 40 from the refrigerant liquid container 81 arranged at a position higher than the cylindrical coil 100, and also to adjust supply amount of the refrigerant liquid 80.

As another embodiment of the present invention, further, as shown in FIG. 5 or FIG. 6, it may be the driving system 1 in which the controlling device 20 activates the circulating means 82 to collect the refrigerant liquid 80 in a gas phase 800 into the refrigerant liquid container 81 in a liquid phase 80.

As another embodiment of the present invention, further, it also may be the driving system 1 consisting of the coreless rotating electrical machine 10 in which a drive shaft 1000 is equipped as being fixed to a center part 340 of the cylindrical mount 300, and rotatably coupled to a center part 240 of the lid-type mount 200.

The sixth aspect of the present invention is a driving system 1 for operating a coreless rotating electrical machine 10 under a load exceeding a rating, wherein the coreless rotating electrical machine 10 is shown by each of the schematic diagrams of FIGS. 3 and 4, and the driving system 1 is shown by each of the schematic diagrams of FIGS. 5 and 6.

It forms an air space 40 including an air gap by a stator 2 consisting of a lid-type mount 200 which fixes one of end faces 101 of an energizable coreless cylindrical coil 100, and a rotor 3 consisting of a cup-type mount 400 opposingly and rotatably positioned with respect to the lid-type mount 200, wherein the cup-type mount 400 included in the rotor 3 has a bottom part 410 open at one end and closed at the other end, to which concentric inner yoke 420 and outer yoke 430 are integrated, the rotor is equipped with a plurality of magnets 4 with intervals 41 with respect to each other in a circumferential direction of an outer surface 422 of the inner yoke 420 and/or an inner surface 431 of the outer yoke 430, and provided with slits 423, each of which passing through the inner yoke 420, at positions of the inner yoke 420 corresponding to each of the intervals 41.

Further, it is the driving system 1 for operating the coreless rotating electrical machine 10 under a load exceeding a rating, wherein the driving system 1 consists of: the coreless rotating electrical machine 10, in which the cylindrical coil 100 is arranged in a first air space 40 as suspended such that the other end face 102 of the cylindrical coil 100 leaves a clearance 411 between the bottom 410 of the cup-type mount 400, a second air space 50 is formed between one of end faces 401 of the cup-type mount 400 and the lid-type mount 200 at an inner periphery side 110 of the cylindrical coil 100, a third air space 60 is formed at an outer periphery side 120 of the cylindrical coil 100, and a channel 8 for supplying a refrigerant liquid 80 to the first air space 40 is provided on the stator 2; a driving device 30 which is activated in coordination with the rotor 3 to drive the coreless rotating electrical machine 10; and a controlling part 20 which is activated in coordination with a coil temperature detecting sensor 21 equipped on the stator 2 to supply a refrigerant liquid 80 to an air space 40.

Further, in the driving system 1 of the present invention, the coreless rotating electrical machine 10 can also be equipped, on the stator 2, with a refrigerant liquid container 81 which is in communication with the channel 8, and a circulating means 82 which communicates between the refrigerant liquid container 81 and the first air space 40.

As apparent from the sixth aspect of the present invention, the driving system 1 is characterized in that, when activating the driving part 30 and operating the coreless rotating electrical machine 10 under the load exceeding the rating, such operation is enabled by activating the controlling part 20 to adjust supply amount of the refrigerant liquid 80 so that the temperature of the cylindrical coil 100 does not exceed the allowable maximum temperature $t_M$ at a rated operation, in which the refrigerant liquid 80 is supplied to inside 421 of the inner yoke 420 of the first air space 40 to allow the cylindrical coil 100, which generates heat, to vaporize the refrigerant liquid 80 fed to the cylindrical coil 100 via the slits 423 so as to cool itself by latent heat of vaporization of the refrigerant liquid 80.

As one embodiment of the present invention, it is more preferable that, when the driving system 1 operates the coreless rotating electrical machine 10 under the load exceeding the rating, an operation of activating the controlling device 20 to supply the refrigerant liquid 80 to inside 421 of the inner yoke 420 of the first air space 40 so that the temperature of the cylindrical coil 100 does not exceed the allowable maximum temperature $t_M$ at a rated operation, and an operation to stop supplying of the refrigerant liquid 80 to the first air space 40 so that the temperature of the cylindrical coil 100 at least does not fall below the minimum temperature $t_N$ where the refrigerant liquid 80 vaporizes by the above operation, are repeated so as to maintain the temperature of the cylindrical coil 100 in a range between the allowable maximum temperature $t_M$ and the minimum temperature $t_N$.

As another embodiment of the present invention, as shown in FIG. 5, it may be the driving system 1 in which the controlling device 20 comprises a pump 22 for supplying the refrigerant liquid 80 to inside 421 of the inner yoke 420 of the first air space 40, and a controller 23 for adjusting supply amount of the refrigerant liquid 80 with on/off command to the pump 22, wherein the controller 23 activates the pump 22 in coordination with the coil temperature detecting sensor 21 and supplies the refrigerant liquid 80 to inside 421 of the inner yoke 420 of the first air space 40 so as to feed the refrigerant liquid 80 to the cylindrical coil 100, which generates heat, via the slits 423 and also to adjust supply amount of the refrigerant liquid 80.

As a further embodiment of the present invention, it may be the driving system 1, as shown in FIG. 6, in which the controlling part 20 comprises an electromagnetic valve 24 for supplying the refrigerant liquid 80 to inside 421 of the inner yoke 420 of the first air space 40 and a controller 23 for adjusting supply amount of the refrigerant liquid 80 with open/close command to the electromagnetic valve 24, wherein the controller 23 activates the electromagnetic valve 24 in coordination with the coil temperature detecting sensor 21, and the refrigerant liquid 80 is supplied to inside 421 of the inner yoke 420 of the first air space 40 from the refrigerant liquid container 81 arranged at a position higher than the cylindrical coil 100 so as to feed the refrigerant liquid 80 to the cylindrical coil 100, which generates heat, via the slits 423 and also to adjust supply amount of the refrigerant liquid 80.

As another embodiment of the present invention, further, as shown in FIG. 5 or FIG. 6, it may be the driving system 1 in which the controlling part 20 activates the circulating means 82 to collect the refrigerant liquid 80 in a gas phase 800 into the refrigerant liquid container 81 in a liquid phase 80.

As another embodiment of the present invention, it also may be the driving system 1 consisting of the coreless rotating electrical machine 10 in which a drive shaft 1000 is equipped as being fixed to a center part 440 of the cup-type mount 400, and rotatably coupled to a center part 240 of the lid-type mount 200.

In the driving system 1 of the present invention, it is preferred that the cylindrical coil 100 of the coreless rotational electrical machine 10 is made from what formed to a cylindrical form by either of a laminate of an electrically conductive metal sheet having linear parts being spaced in a longitudinal direction covered with insulating layers, or a linear conductor covered with an insulating layer.

In the driving system 1 of the present invention, it is preferred that the refrigerant liquid 80 is any of water, ethanol, ammonia, liquid nitrogen, liquid helium or fluorinated liquid.

Figure 1:
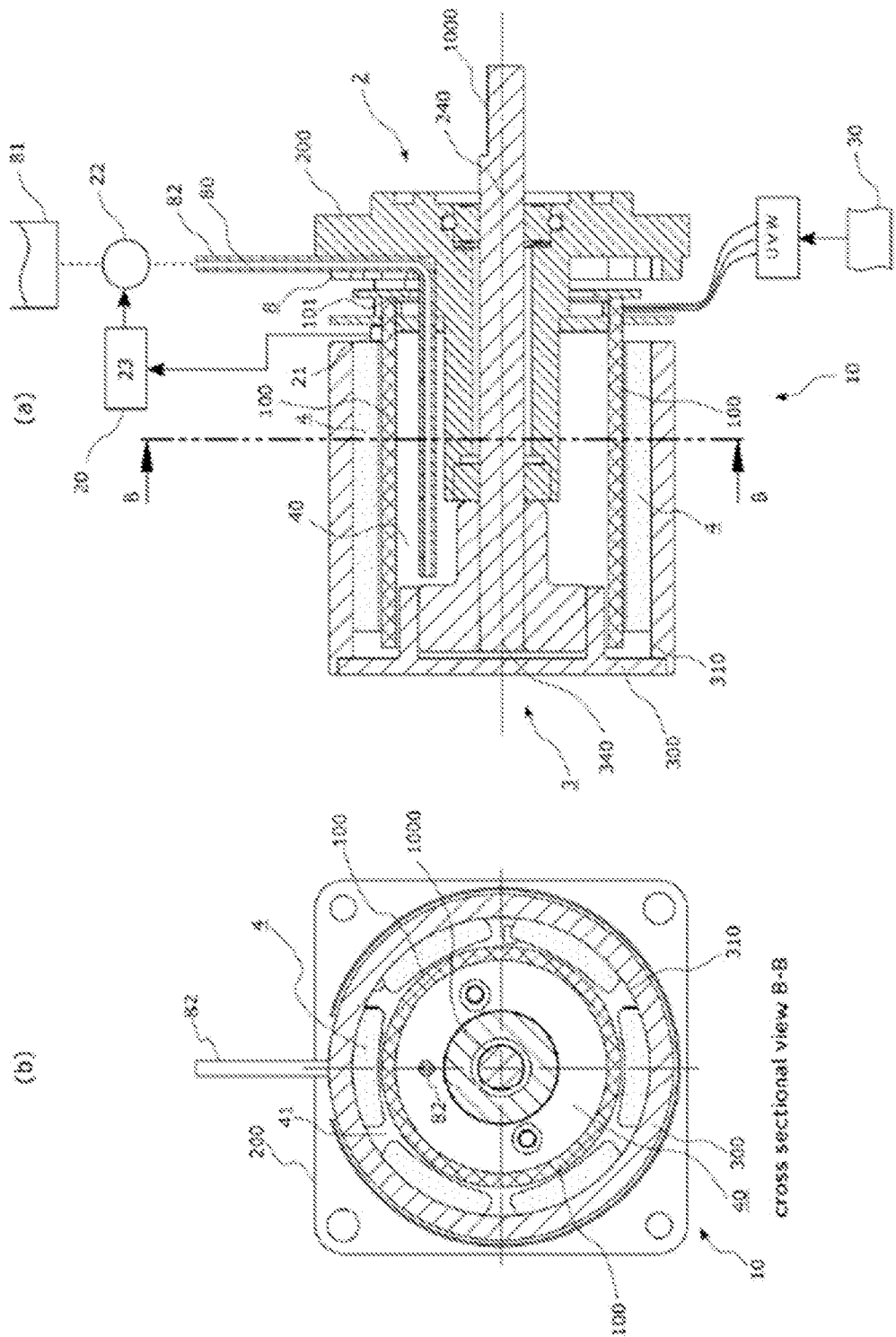
FIG. 1 is a cross sectional schematic diagram of a coreless rotating electrical machine comprising a rotor consisting of a cylindrical mount opposingly and rotatably positioned with respect to a stator consisting of a lid-type mount including a cylindrical coil, which is an embodiment of the present invention.
Figure 2:
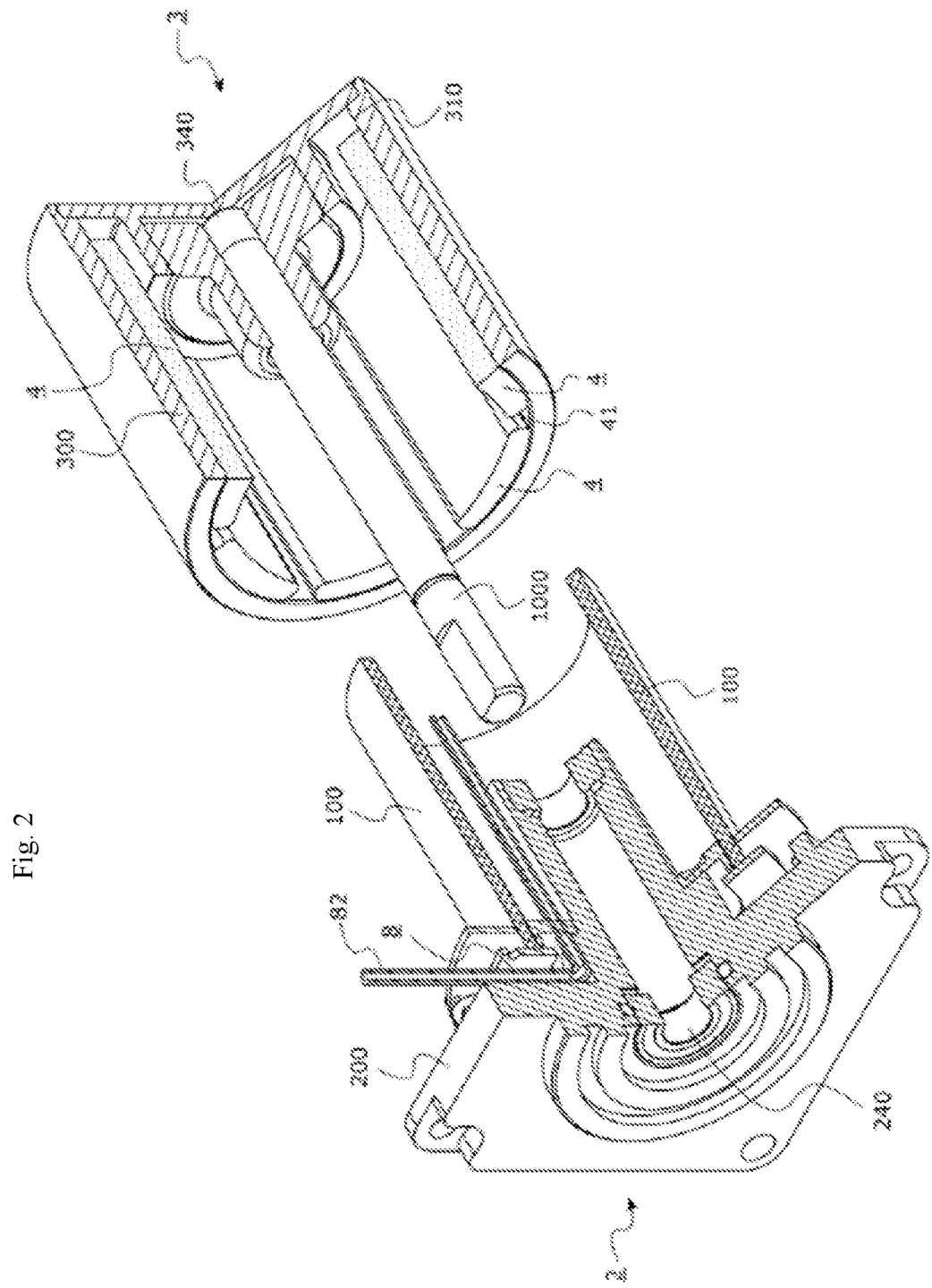
FIG. 2 is a perspective diagram of a partially cutout coreless rotating electrical machine shown in FIG. 1.

The inventors of the present invention have confirmed that a continuous operation of a coreless motor (CP50) is possible by completely controlling a temperature of a cylindrical coil, which is an armature coil, with a load exceeding a rated torque $T_0$=0.28 Nm being continuously applied to the coreless motor (CP50).

A feature of a basic structure of a coreless rotating electrical machine 10 (hereinafter referred as "coreless motor 10") equipped with a stator 2 comprising a cylindrical coil 100 of the present invention is that, firstly, a cylindrical coil 100 is used as an armature coil which one end is fixed to a stator 2, wherein the cylindrical coil 100 is made with a laminate of electrically conductive metal sheets having linear parts being spaced in a longitudinal direction covered with insulating layers, or a linear conductor covered with an insulating layer, formed to a cylindrical form. It is an energizable coreless cylindrical coil, preferably having a certain rigidity with a thickness, consisting of two layers or four layers, of 5 mm or less.

A second feature of the basic structure is that, it is a coreless motor 10 having a structure in which one of end faces of the cylindrical coil 100 is closed by an inner surface of a lid-type mount 200 included in the stator 2, and the other end face of the cylindrical coil 100, which is open, is inserted as suspended in an air space or a first air space 40 including an air gap in which a magnetic field is formed by a bottom of a cylindrical mount 300 or a cup-type mount 400 of the rotor 3 consisting of a magnetic body and an inner surface of the cylindrical mount 300 or an outer yoke 430 of the cup-type mount 400 equipped with a plurality of magnets (permanent magnets) 4.

Then, by feeding a refrigerant liquid 80 to an inner face of the cylindrical coil 100, or inside of an inner yoke 420 of the rotor 3 consisting of the cup-type mount 400, the refrigerant liquid 80 is vaporized at the inner face of the cylindrical coil 100, which generates heat, when it passes through the air gap in which the magnetic field is formed. The cylindrical coil 100 is thereby cooled at the inner face with latent heat of vaporization, and entire cylindrical coil including an outer face is instantaneously cooled by heat transfer. This is one of the features of a cooling structure of the coreless motor of the present invention.

A third feature of the basic structure is that a controlling part or controlling device 20, which is activated when the coreless motor 10 is operated under a load exceeding a rating, is arranged in association with the stator 2, and that it comprises a coil temperature detecting sensor 21 for detecting temperature increase of the cylindrical coil 100 in operation. This feature is to have the controlling part or controlling device 20 adjust supply amount of the refrigerant liquid 80 so that the cylindrical coil 100 does not exceed the allowable maximum temperature $t_M$ under rated operation, in coordination with the coil temperature detecting sensor 21. The coreless motor 10 which continuously operates under the load exceeding the rating is achieved thereby. Driving tests considering various overload conditions are performed for the coreless motor 10 of the present invention as shown in FIGS. 13 to 18 and FIG. 20.

Figure 7:
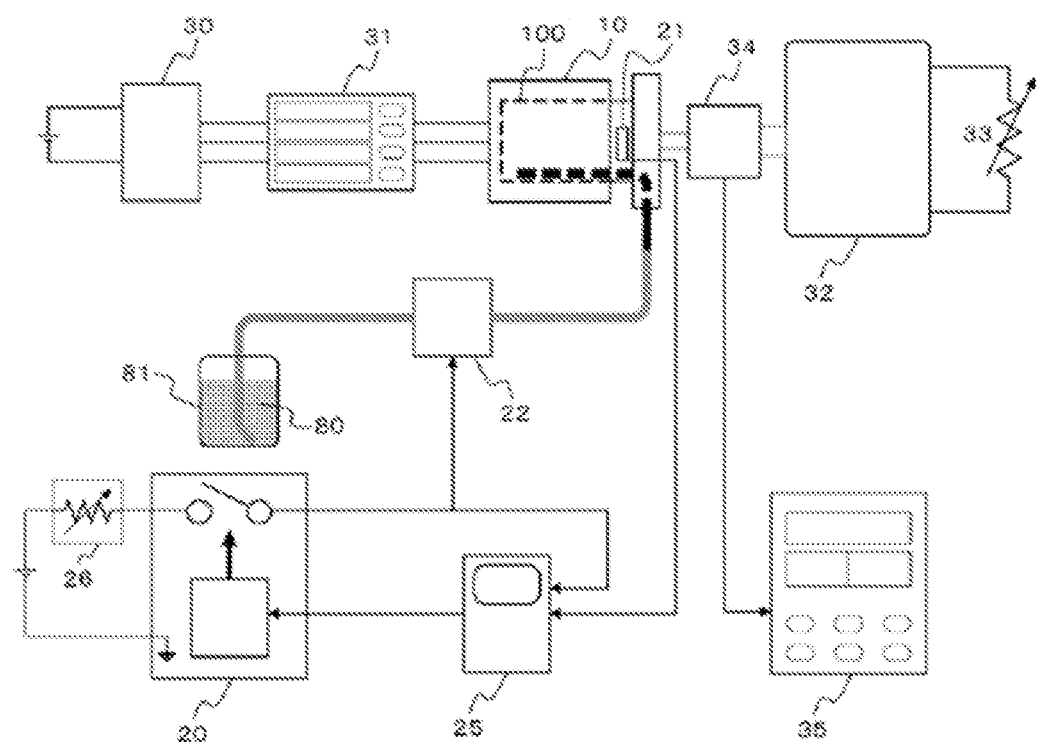
FIG. 7 is a schematic diagram of a driving test of a measured motor (CP50) of the coreless rotating electrical machine comprising a rotor consisting of a cup-type mount opposingly and rotatably positioned with respect to a stator consisting of the lid-type mount including a cylindrical coil.
Figure 8:
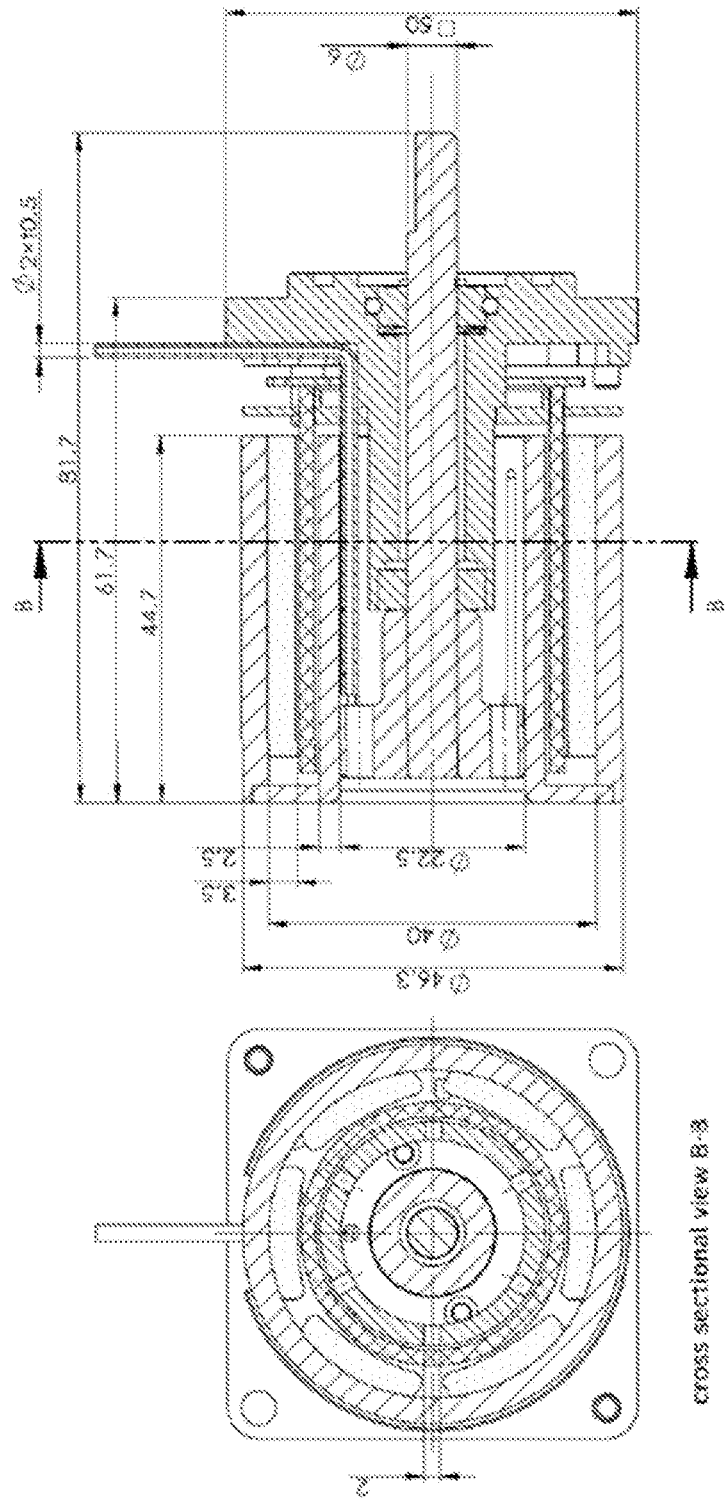
FIG. 8 is a detailed diagram representing dimensions of the measured motor (CP50) shown in FIG. 7.

FIG. 7 is a schematic diagram of a driving test apparatus of a measured motor (CP50) based on one embodiment of the coreless rotating electrical machine 10 equipped with the rotor 3 consisting of the cup-type mount 400 opposingly and rotatably positioned with respect to the stator 2 consisting of the lid-type mount 200 including the cylindrical coil 100. FIG. 8 is a detailed diagram of an actually measured structure of the measured motor (CP50).

As apparent from FIG. 7, an output axis 1000, which diameter $\Phi$ is 6 mm, of the coreless motor 10 which is the measured motor (CP50) is coupled to an electric generator 32 (m-link CPH80-E) via a torque sensor 34 (UNIPULSE UTM II-5 Nm) to which a torque meter 35 (UNIPULSE TM301) is connected. The electric power generated by the electric generator 32 is made to be consumed by a variable load 33 (m-link VL300), and an arbitrary load is applied to the coreless motor 10 to drive thereof. Current of the coreless motor 10 is measured with a power meter 31 (HIOKI PW3336) which is arranged between a driving part or driving device 30 (a three-phase PWM type, m-link MLD750-ST) and the coreless motor 10. Current I(A), Voltage V(V) and Electric power Pi(W) can be measured by the power meter 31.

Then, temperature t and voltage is input to the controlling part or controlling device 20 (m-link TH300) including a CPU via a device (GRAPHTEC GL-100) which records the temperature t and voltage measured by the coil temperature detecting sensor 21 arranged on the cylindrical coil 100. The controlling part or controlling device 20 activates a refrigerant liquid supply pump 22 (NITTO UPS-112) at an appropriately set temperature t, deactivates the pump, and the refrigerant liquid 80 is supplied to the first air space 40 of the coreless motor 10 from a refrigerant liquid container 81. Flow volume of the refrigerant liquid 80 is made to be adjusted by varying driving voltage of the refrigerant liquid supply pump 22 using a refrigerant liquid flow volume varying device 26 (TOKYO-RIKOSHA TYPE RSA-5) equipped in association with the controlling part or controlling device 20. The coreless motor 10 is further provided with a channel 8 including a pipe 82 and a plurality of slits 423 in the inner yoke 420 of the rotor 3 in an axial direction.

Dimensions of the coreless motor 10 which is the measured motor shown in FIG. 8 are overviewed. An axial length of the output axis coupled and fixed to the stator 2 and rotatably coupled to the rotor 3 is L=81.7 mm. A side of a rectangular bottom of the stator 2 is x=50 mm, an outer diameter of the outer yoke of the rotor 3 is $\Phi$=46.3 mm, an inner diameter is $\Phi$=40 mm, and a thickness is $\Delta$=3.15 mm. A diameter of a rotor axis part is $\Phi$=22.5 mm, which corresponds to an inner diameter $\Phi$ of the inner yoke 420. An outer diameter thereof is $\Phi$=27.5 mm, and a thickness is $\Delta$=2.5 mm. A thickness of each of the four magnets 4 equipped on the inner face of the outer yoke 430 is $\Delta$=3.5 mm. A width of the air gap formed by the inner yoke 420 and the outer yoke 430 is $\Psi$=2.75 mm, and a width of the cylindrical coil 100 equipped as suspended in the air gap is $\Delta$=1.50 mm.

The driving test using the coreless motor 10 which is the measured motor (CP50) is to verify a function effect obtained by directly spraying pure water 80, which is the refrigerant liquid, to the cylindrical coil 100, which generates heat, for cooling thereof by latent heat of vaporization of the pure water 80, and that the continuous operation of the coreless motor 10 is possible even under the load condition exceeding the rating by such cooling function.

A test procedure of the coreless motor 10 is as follows. Voltage $V_0$=24(V) is set as applied voltage to the driving part or driving device 30 (three-phase PWM type, m-link MLD750-ST) (hereinafter referred as "driving device 30") shown in FIG. 7. It is also possible to perform the test by setting the voltage $V_0$ as 36(V) and/or 48(V), higher than 24(V), with the same work, and needless to say, results may be of course different in each of the cases.

Next, a load torque T applied to the coreless motor 10 is raised with the variable load 33 of the electric generator 32. The flow volume of the refrigerant liquid (pure water) 80 is adjusted so as to be corresponded with the setting of load torque T by varying the driving voltage of the refrigerant liquid supply pump 22 using the refrigerant liquid flow volume varying device 26 equipped in association with the controlling part or controlling device 20 (hereinafter referred as "controlling device 20"). The allowable maximum temperature of the cylindrical coil 100 used in the coreless motor 10 is 130° C. Therefore, the adjustment is performed by operating the coreless motor such that the temperature difference $_\Delta t$ between the maximum temperature $t_{c1}$ of the cylindrical coil under control and the minimum temperature $t_{c2}$ of the cylindrical coil under control comes narrow, under a condition where the temperature of the cylindrical coil does not exceed the allowable maximum temperature $t_M=130°$ C., and does not fall below the minimum temperature $t_N$, where the refrigerant liquid (pure water) vaporizes to measure the load torque T and the flow volume of the refrigerant liquid (pure water) 80 at such point.

Figure 10:
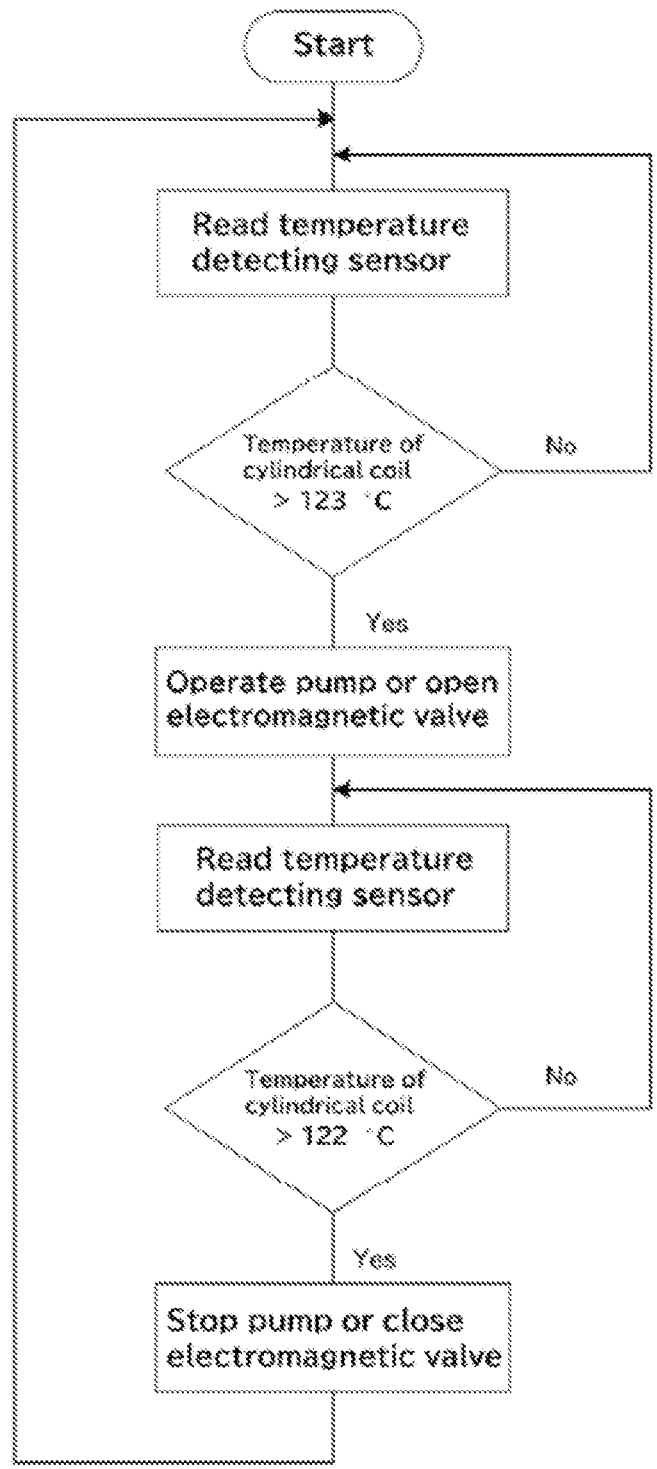
FIG. 10 is a control flow of supplying a refrigerant liquid, in which a load of the measured motor (CP50) is raised by a variable load of an electric generator via a torque sensor shown in FIG. 7, the measured motor is operated such that a temperature difference $_\Delta t$ between the maximum temperature $t_{c1}$ of the cylindrical coil under control and the minimum temperature $t_{c2}$ of the cylindrical coil under control comes narrow, under a condition where the temperature of the cylindrical coil does not exceed the allowable maximum temperature $t_M$ and does not fall below the minimum temperature $t_N$ where the refrigerant liquid (pure water) vaporizes, and the maximum torque and refrigerant liquid flow volume are measured, in a case where applied voltage of the measured motor (CP50) is set to 24V.

FIG. 10 is a control flow in which the load of the measured motor (CP50) 10 is raised with the variable load 33 of the electric generator 32 via the torque sensor 34 shown in FIG. 7 to have the coreless motor 10 operated such that the temperature difference $_\Delta t$ between the maximum temperature $t_{c1}$ of the cylindrical coil under control and the minimum temperature $t_{c2}$ of the cylindrical coil under control comes narrow, under a condition where the temperature of the cylindrical coil does not exceed the allowable maximum temperature $t_M=130°$ C. and does not fall below the minimum temperature $t_N$ where the refrigerant liquid (pure water) vaporizes.

As apparent from FIG. 10, the coil temperature detecting sensor 21 is read (first read-in), and when the temperature t of the cylindrical coil 100 exceeds $t_{L1}=123°$ C., the refrigerant liquid supply pump 22 is operated to supply the refrigerant liquid. The coil temperature detecting sensor 21 is read (second read-in) further, and when the temperature t of the cylindrical coil 100 falls below $t_{L2}=122°$ C., the refrigerant liquid supply pump 22 is deactivated to stop supply of the refrigerant liquid. During such period, in a case where the temperature t of the cylindrical coil does not reach such set temperatures, the first read-in and the second read-in of the coil temperature detecting sensor 21 are repeated.

The maximum torque $T_M$, when the applied voltage to the driving device 30 of the coreless motor 10 is set to 24V, is thus measured, and the flow volume $L_M$ per minute of the refrigerant liquid (pure water) 80 at such point is measured. Operating conditions of the refrigerant liquid supply pump 22 are as in the followings.
(1) Cooling start temperature $t_{L1}=123°$ C. (the first read-in)
(2) Cooling stop temperature $t_{L2}=122°$ C. (the second read-in)
When the refrigerant liquid supply pump 22 is switched with respective read-in conditions of (1) and (2) to activate the coreless motor 10, values are: the torque $T_M=0.42$ Nm and the flow volume $L_M=1.141$ ml/min.

A technical basis for using the maximum torque $T_M$ and the maximum flow volume $L_M$ is as follows: when the coreless motor is operated with a torque T exceeding 0.42 Nm, the flow volume of the refrigerant liquid 80 also increases. However, we have confirmed that, with the increase of the refrigerant liquid 80, the refrigerant liquid 80 is discharged in a form of a mist (liquid phase) to outside of the coreless motor 10 without being vaporized by the cylindrical coil 100. Therefore, the torque T=0.42 Nm becomes a critical torque which allows the coreless motor 10 to be operated continuously under a load exceeding the rated torque $T_0=0.28$ Nm.

Figure 9:
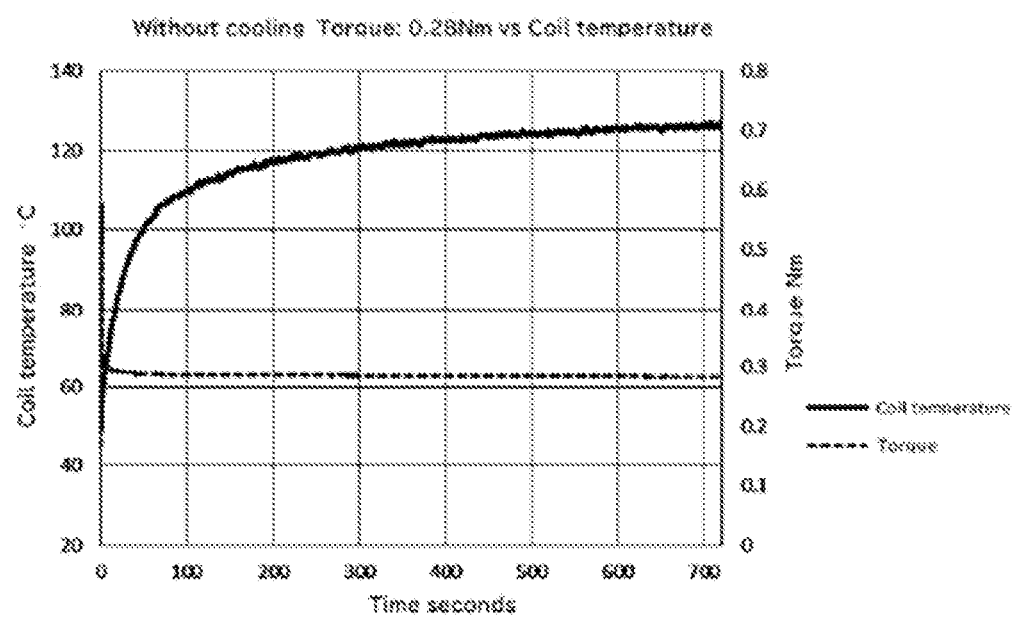
FIG. 9 is what has excerpted a shift of load torque and a shift of temperature t of the cylindrical coil with respect to time (seconds) from start-up up to when 720 seconds (12 minutes) has passed in a case where applied voltage of the measured motor (CP50) is set to 24V, and a torque, with which the temperature of the cylindrical coil does not exceed an allowable maximum temperature $t_M$ (=130° C.), even if the measured motor (CP50) is operated without the refrigerant liquid (pure water) supplied to the cylindrical coil, is used as a rated torque of the measured motor (CP50).

FIG. 9 represents a torque which allows the coreless motor to be continuously operated without supplying the pure water 80, which is the refrigerant liquid, thereto, and with which the cylindrical coil 100 does not exceed the allowable maximum temperature $t_M=130°$ C. When the coreless motor 10 is continuously operated under the load torque $T_0=0.28$ Nm, as apparent form FIG. 9, the temperature of the cylindrical coil 100 reaches 100° C. in 50 seconds, and exceeds 120° C. in 300 seconds (5 minutes). The temperature reaches 127° C. in 720 seconds (12 minutes), and later, temperature equilibration is achieved at the allowable maximum temperature $t_M=130°$ C. or less. FIG. 9 simply represents that the rated torque $T_0$, which allows the coreless motor to be continuously operated when the refrigerant liquid is not supplied, is $T_0=0.28$ Nm.

Next, a load torque T exceeding the rated torque $T_0$ is applied to the coreless motor 10 when the applied voltage to the driving device 30 is set to 24V. Then, as apparent form FIG. 12, the current increases in proportion to the raised load torque T, and with heat generation of the cylindrical coil 100 associated therewith, a supply amount of the refrigerant liquid (pure water) 80 is increased. Thus, it is confirmed that, as a result of an appropriate control of the driving system 1, the continuous operation under the overload condition is possible.

Specifically, the coreless motor 10 is activated in 5 cases in which the load torque T, for continuously operating the coreless motor 10 under the load exceeding the rated torque $T_0$, is set to $T_1=0.33$ Nm, $T_2=0.36$ Nm, $T_3=0.39$ Nm, $T_4=T_M=0.42$ Nm, and further, set to $T_4=0.42$ Nm and lowered to $T_1=0.33$ Nm and then set to $T_4=0.42$ Nm again.

It is confirmed that, a normal continuous operation of the coreless motor 10 is possible under any set torque exceeding the rated torque $T_0$ with a control by the controlling device 20 in which the refrigerant liquid supply pump 22 is switched such that, at the cooling start temperature $t_{L1}=123°$ C. (the first read-in), the refrigerant liquid is supplied at a temperature t exceeding the cooling start temperature, and at the cooling stop temperature $t_{L2}=122°$ C. (the second read-in), the supply of the refrigerant liquid is stopped at a temperature t below such temperature, so that the temperature difference $_\Delta t$ between the maximum temperature $t_{c1}$ of the cylindrical coil under control and the minimum temperature $t_{c2}$ of the cylindrical coil under control comes narrow, under a condition where the temperature of the cylindrical coil does not exceed the allowable maximum temperature $t_M=130°$ C. thereof and does not fall below the minimum temperature $t_N$ where the refrigerant liquid (pure water) vaporizes.

The operation condition of the refrigerant liquid supply pump 22 is made as: cooling start (first read-in) temperature $t_{L1}=123°$ C. This is a set value which allows temperature increase due to overshoot at a time when the cooling started, and which the cylindrical coil 100 does not exceed the allowable maximum temperature $t_M=130°$ C. In addition, the cooling stop (the second read-in) temperature is made as $t_{L2}=122°$ C. This is a set value which allows temperature decrease due to overshoot at a time when the cooling stopped, and further, which prevents malfunction due to foreign noise etc. for operating the system stably by making hysteresis with the cooling start (first read-in) temperature $t_{L1}=123°$ C. as 1° C. With such operating conditions, the temperature difference $_\Delta t$ between the maximum temperature $t_{c1}$ of the cylindrical coil under control and the minimum temperature $t_{c2}$ of the cylindrical coil under control comes narrow, and thus, stress to the cylindrical coil due to thermal shock is alleviated, and change of electric resistance value of the cylindrical coil may be narrowed.

In the followings, results confirmed with different load torques T under identical equipments and identical control conditions are described. Each of the results is shown in FIGS. 13 to 17.

Figure 13:
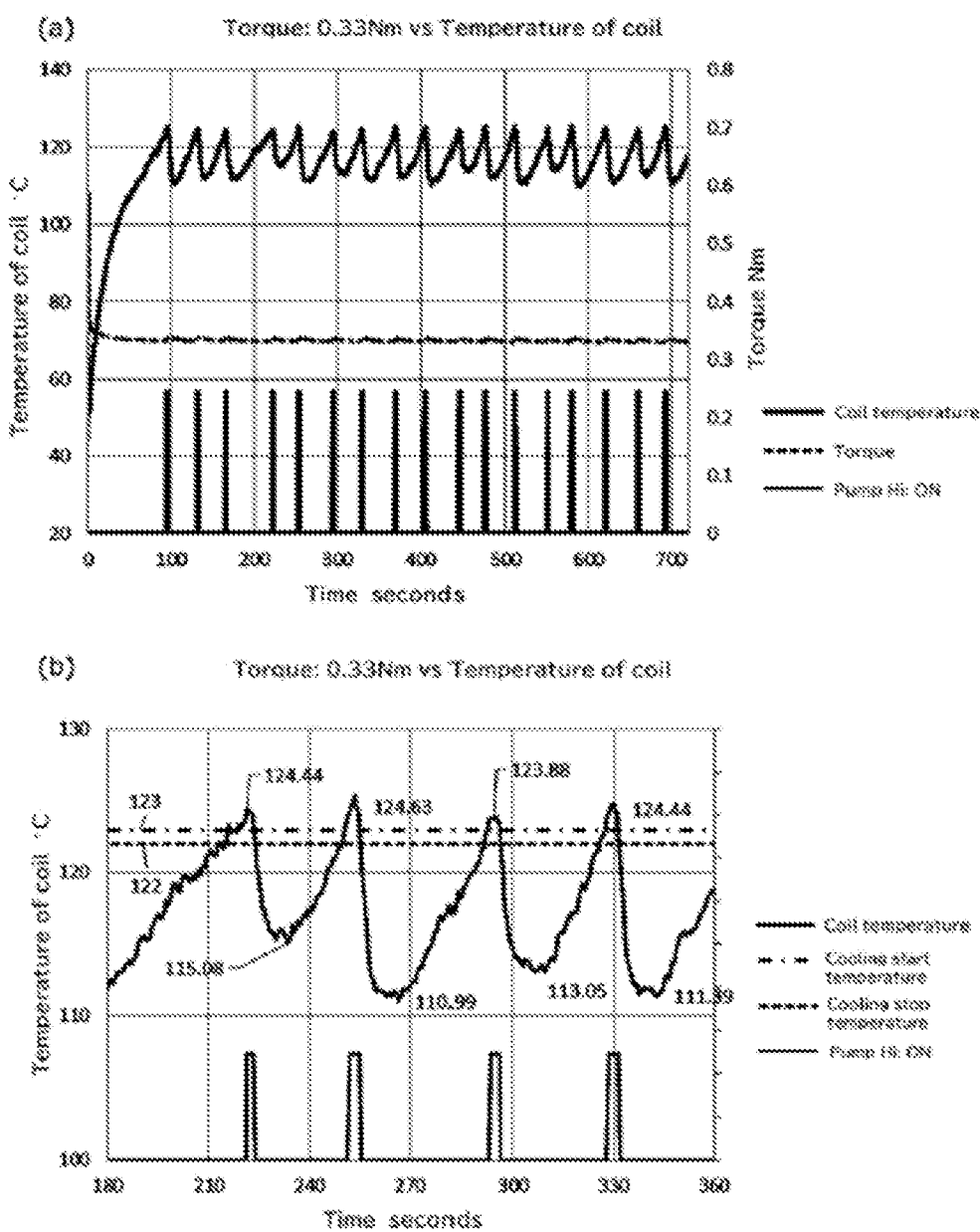
FIG. 13 represents a shift of temperature t of the cylindrical coil, a shift of on/off timing of the pump and a shift of temperature t of the cylindrical coil, a shift of on/off pulse of the pump during a period from start-up up to when 180 to 360 seconds has passed from then, in a case of the load torque T=0.33 Nm.

FIG. 13 is a result of a driving test of the coreless motor 10 in which the load torque $T_1$ is set to $T_1$=0.33 Nm with the variable load 33 of the electric generator 32. As apparent from FIG. 13(a), during an operation test of the coreless motor 10, the coreless motor 10 is operated such that the cylindrical coil 100 is maintained within a certain temperature range by an on/off pulse operation of the refrigerant liquid supply pump 22, with the torque $T_1$ maintained at 0.33 Nm. More specifically, the temperature t of the cylindrical coil 100 exceeds the cooling start temperature ($t_{L1}$=123° C.) in around 100 seconds after start-up of the coreless motor 10. At this moment, the refrigerant liquid (pure water) 80 is directly supplied to the cylindrical coil 100 through the slits which respectively penetrates into the inner yoke. Then, when the cylindrical coil 100 is cooled by latent heat of vaporization and falls below the cooling stop temperature ($t_{L2}$=122° C.), the supply of the refrigerant liquid (pure water) 80 is stopped. With repetition of such pulse operation, the temperature t of the cylindrical coil shifts in a range between 111° C. and 125° C. which is the certain temperature range. FIG. 13(a) is what has excerpted a period from when the coreless motor 10 is started up to when 720 seconds (12 minutes) has passed in a continuous operation test, and we have confirmed that the temperature shift for a period from 720 seconds (12 minutes) onward is almost similar.

FIG. 13(b) is a diagram which has enlarged a temperature waveform of the cylindrical coil 100 of 3 minutes from when 180 seconds (3 minutes) has passed from the start-up up to when 360 seconds (6 minutes) has passed from the start-up, which is after cooling has started. A condition where rapid cooling is caused can be easily determined from the figure. The first read-in temperature $t_{L1}$ is 123° C., and when the cooling is started by supplying the refrigerant liquid 80 at a temperature t exceeding such temperature, the temperature increase due to overshoot is around within 2° C., and become reversed immediately thereafter. The second read-in temperature $t_{L2}$ after reverse is 122° C., and even when the supply of the refrigerant 80 is stopped at a temperature t which is below such temperature, the temperature after decrease further decreases by around 11° C. to 7° C. due to overshoot. Specifically, the maximum temperature $t_{c1}$=125° C., the minimum temperature $t_{c2}$=111° C., and $_\Delta t$=14° C., of the cylindrical coil under control, with the load torque set to $T_1$=0.33 Nm. Therefore, we have confirmed that, a normal continuous operation is possible by controlling such that the temperature difference $_\Delta t$ between the maximum temperature $t_{c1}$ and the minimum temperature $t_{c2}$ of the cylindrical coil 100 under control comes narrow, under a condition where the temperature of the cylindrical coil 100 does not exceed the allowable maximum temperature $t_M$=130° C. and does not fall below the minimum temperature $t_N$ where the refrigerant liquid (pure water) vaporizes.

Figure 14:
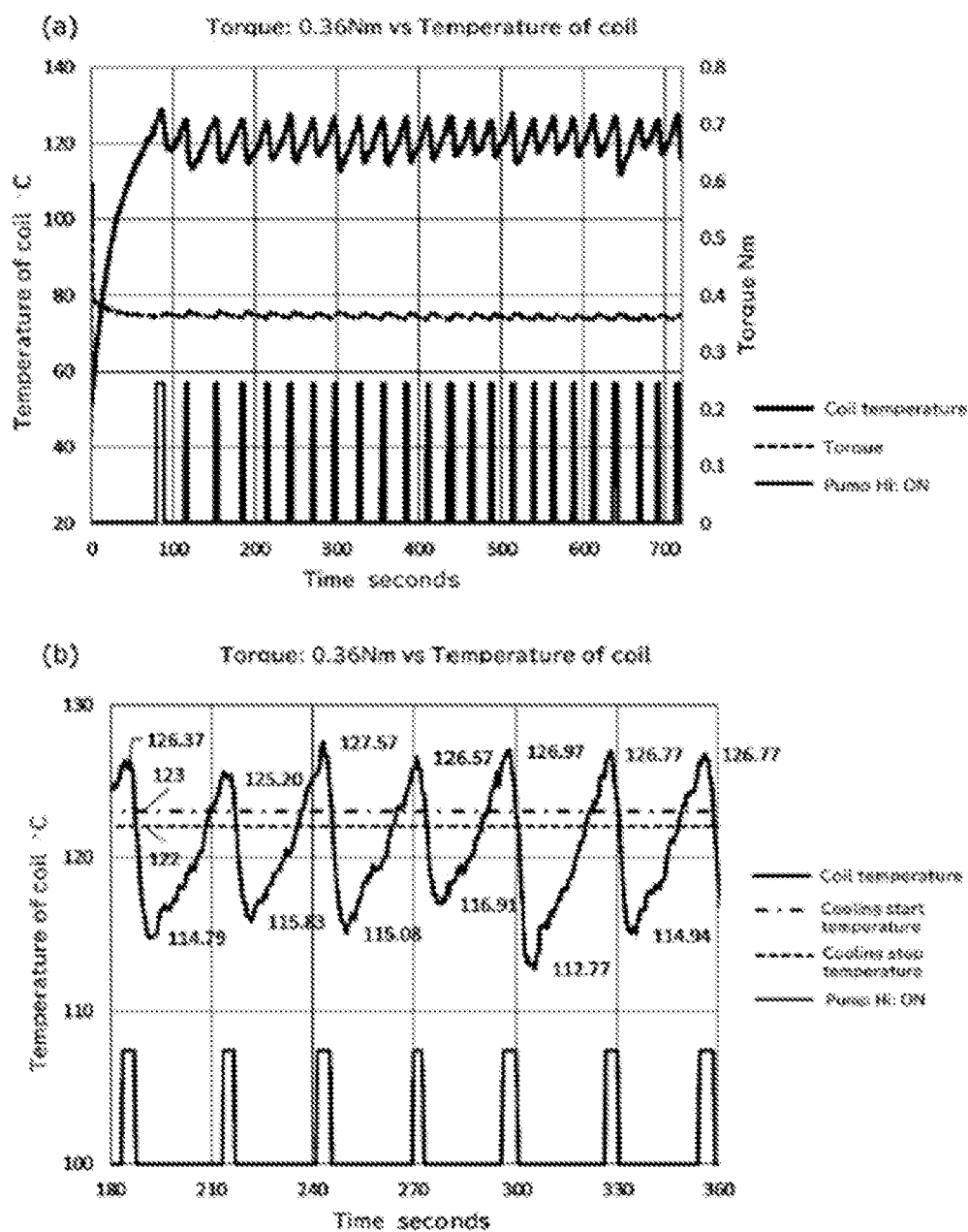
FIG. 14 represents a shift of temperature t of the cylindrical coil, a shift of on/off pulse of the pump, and a shift of temperature t of the cylindrical coil, a shift of on/off pulse of the pump during a period from start-up up to when 180 to 360 seconds has passed from then, in a case of the load torque T=0.36 Nm.

FIG. 14 is a result of a driving test of the coreless motor 10 in which the load torque $T_2$ is set to $T_2$=0.36 Nm with the variable load 33 of the electric generator 32. As apparent from FIG. 14(a), during the operation test of the coreless motor 10, the coreless motor 10 is operated such that the cylindrical coil 100 is maintained within a certain temperature range by the on/off pulse operation of the refrigerant liquid supply pump 22, with the torque $T_2$ maintained at 0.36 Nm. The temperature t of the cylindrical coil 100 exceeds the cooling start temperature ($t_{L1}$=123° C.) in around 90 seconds after start-up of the coreless motor 10. At this moment, the refrigerant liquid (pure water) 80 is directly supplied to the cylindrical coil 100. Then, when the cylindrical coil 100 is cooled by latent heat of vaporization and falls below the cooling stop temperature ($t_{L2}$=122° C.), the supply of the refrigerant liquid (pure water) 80 is stopped. With repetition of such pulse operation, the temperature t of the cylindrical coil shifts in a range between 113° C. and 128° C. which is the certain temperature range. FIG. 14(a) is what has excerpted a period from when the coreless motor 10 is started up to when 720 seconds (12 minutes) has passed in a continuous operation test, and we have confirmed that the temperature shift for a period from 720 seconds (12 minutes) onward is almost similar.

Figures 11, 12:
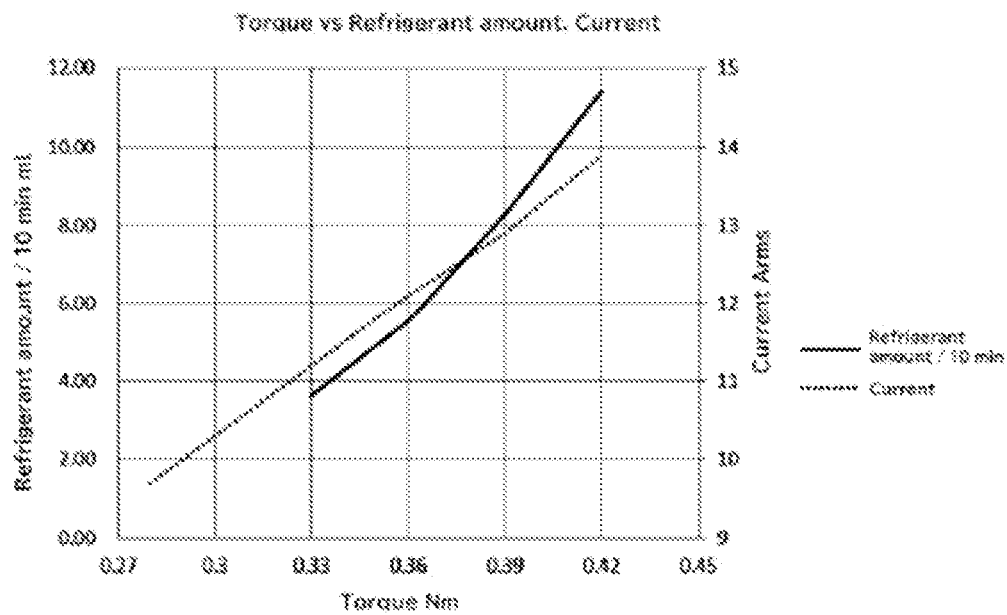
FIG. 11 is a table of current (Arms), rotational speed (rpm), output (W), pump conveyed amount (ml/min), total pump activation time (sec) in 10 minutes and refrigerant (pure water) amount (ml) in 10 minutes when the measured motor (CP50) is driven with respective load torque T ($T_1$=0.33 Nm, $T_2$=0.36 Nm, $T_3$=0.39 Nm, $T_4$=0.42 Nm) exceeding the rated torque.
FIG. 12 is a graph of the current (Arms) and the refrigerant (pure water) amount (ml) in 10 minutes with respect to the load torque T of FIG. 11.

During the operation test of the coreless motor 10, a total pump operation time of 10 minutes from when the refrigerant liquid supply has started for case of the torque $T_1$ is 56 seconds, on the other hand, it is 85.5 seconds for the case of the torque $T_2$. The supply amount of the refrigerant liquid during such period is 3.62 ml for the case of the torque $T_1$, on the other hand, it is 5.53 ml for the case of the torque $T_2$, and it is 1.5 times more compared with the case of the torque $T_1$ (FIGS. 11 and 12).

FIG. 14(b) is a diagram which has enlarged a temperature waveform of the cylindrical coil 100 of 3 minutes from when 180 seconds (3 minutes) has passed from the start-up up to when 360 seconds (6 minutes) has passed from the start-up, which is after cooling has started. A condition where rapid cooling is caused can be easily determined from the figure. The first read-in temperature $t_{L1}$ is 123° C., and when the cooling is started by supplying the refrigerant liquid 80 at a temperature t exceeding such temperature, the temperature increase due to overshoot is around 5° C., and then reversed. The second read-in temperature $t_{L2}$ after reverse is 122° C., and even when the supply of the refrigerant 80 is stopped at a temperature t which is below such temperature, the temperature after decrease further decreases by around 9° C. to 5° C. due to overshoot. Specifically, the maximum temperature $t_{c1}$=128° C., the minimum temperature $t_{c2}$=113° C., and $_\Delta t$=15° C., of the cylindrical coil under control, with the load torque set to $T_2$=0.36 Nm. A pulse interval becomes shorter compared with the case for the torque $T_1$=0.33 Nm. We have confirmed that, a normal continuous operation is possible also for this case by controlling such that the temperature difference $_\Delta t$ between the maximum temperature $t_{c1}$ and the minimum temperature $t_{c2}$ of the cylindrical coil 100 under control comes narrow, under a condition where the temperature of the cylindrical coil 100 does not exceed the allowable maximum temperature $t_M$=130° C. and does not fall below the minimum temperature $t_N$ where the refrigerant liquid (pure water) vaporizes.

Figure 15:
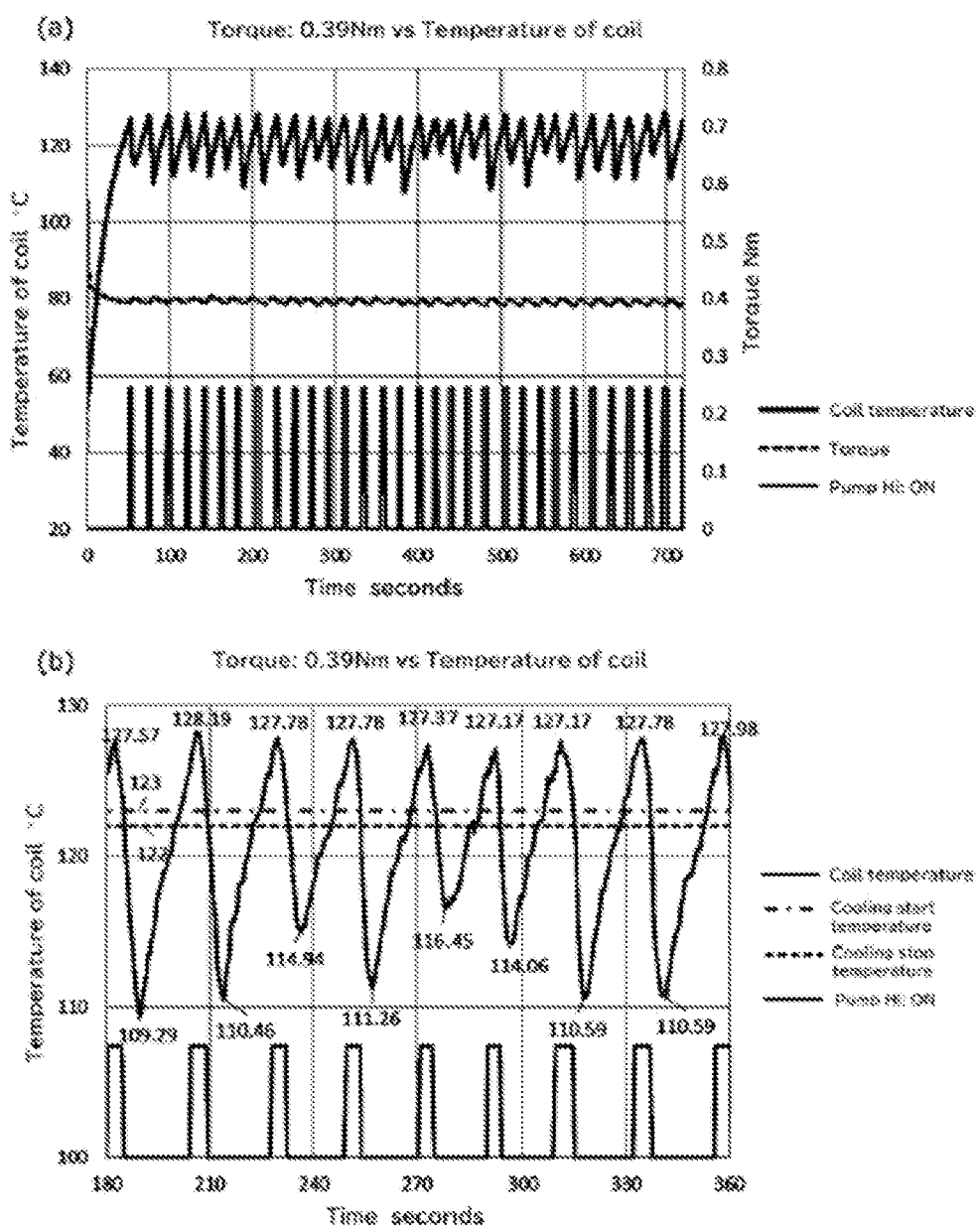
FIG. 15 represents a shift of temperature t of the cylindrical coil, a shift of on/off pulse of the pump, and a shift of temperature t of the cylindrical coil, a shift of on/off pulse of the pump during a period from start-up up to when 180 to 360 seconds has passed from then, in a case of the load torque T=0.39 Nm.

FIG. 15 is a result of a driving test of the coreless motor 10 in which the load torque $T_3$ is set to $T_3$=0.39 Nm with the variable load 33 of the electric generator 32. As apparent from FIG. 15(a), during the operation test of the coreless motor 10, the coreless motor 10 is operated such that the cylindrical coil 100 is maintained within a certain temperature range by the on/off pulse operation of the refrigerant liquid supply pump 22, with the torque $T_3$ maintained at 0.39 Nm. The temperature t of the cylindrical coil 100 exceeds the cooling start temperature ($t_{L1}$=123° C.) in around 50 seconds after start-up of the coreless motor 10. At this moment, the refrigerant liquid (pure water) 80 is directly supplied to the cylindrical coil 100. Then, when the cylindrical coil 100 is cooled by latent heat of vaporization and falls below the cooling stop temperature ($t_{L2}$=122° C.), the supply of the refrigerant liquid (pure water) 80 is stopped. With repetition of such pulse operation, the temperature t of the cylindrical coil shifts in a range between 109° C. and 128° C. which is the certain temperature range. FIG. 15(a) is what has excerpted a period from when the coreless motor 10 is started up to when 720 seconds (12 minutes) has passed in a continuous operation test, and we have confirmed that the temperature shift for a period from 720 seconds (12 minutes) onward is almost similar.

During the operation test of the coreless motor 10, a total pump operation time of 10 minutes from when the refrigerant liquid supply has started for the case of the torque $T_1$ is 56 seconds, on the other hand, it is 128 seconds for the case of the torque $T_3$. The supply amount of the refrigerant liquid during such period is 3.62 ml for the case of the torque $T_1$, on the other hand, it is 8.28 ml for the case of the torque $T_3$, and it is 2.3 times more compared with the case of the torque $T_1$ (FIGS. 11 and 12).

FIG. 15(b) is a diagram which has enlarged a temperature waveform of the cylindrical coil 100 of 3 minutes from when 180 seconds (3 minutes) has passed from the start-up up to when 360 seconds (6 minutes) has passed from the start-up, which is after cooling has started. A condition where rapid cooling is caused can be easily determined from the figure. The first read-in temperature $t_{L1}$ is 123° C., and when the cooling is started by supplying the refrigerant liquid 80 at a temperature t exceeding such temperature, the temperature increase due to overshoot is around 5° C., and then reversed. The second read-in temperature $t_{L2}$ after reverse is 122° C., and even when the supply of the refrigerant 80 is stopped at a temperature t which is below such temperature, the temperature after decrease further decreases by around 13° C. to 5° C. due to overshoot. Specifically, the maximum temperature $t_{c1}$=128° C., the minimum temperature $t_{c2}$=109° C., and $_\Delta t$=19° C., of the cylindrical coil under control, with the load torque set to $T_3$=0.39 Nm. A pulse interval becomes further shorter compared with the case for the torque $T_2$=0.36 Nm. We have confirmed that, a normal continuous operation is possible also for this case by controlling such that the temperature difference $_\Delta t$ between the maximum temperature $t_{c1}$ and the minimum temperature $t_{c2}$ of the cylindrical coil 100 under control comes narrow, under a condition where the temperature of the cylindrical coil 100 does not exceed the allowable maximum temperature $t_M$=130° C. and does not fall below the minimum temperature $t_N$ where the refrigerant liquid (pure water) vaporizes.

Figure 16:
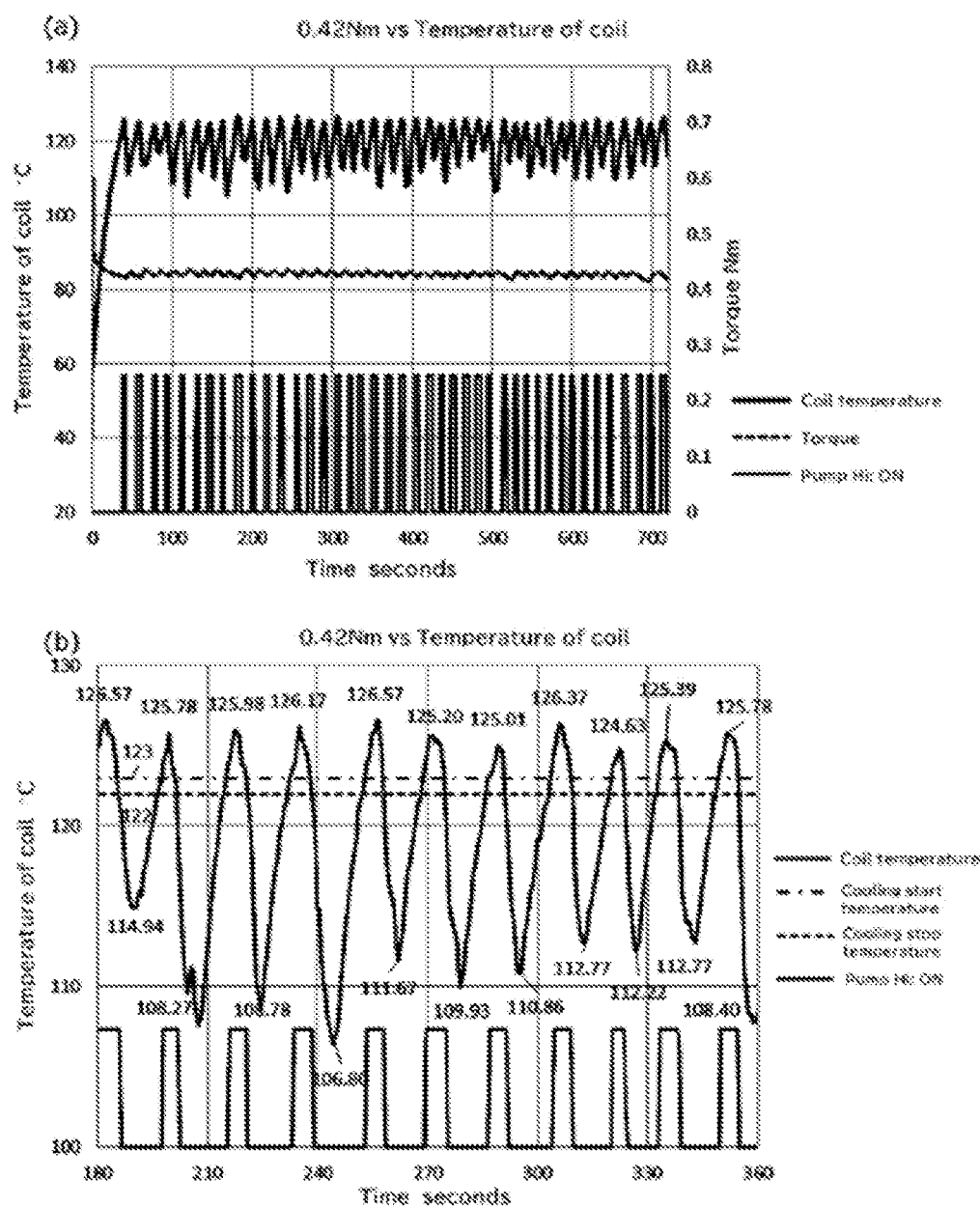
FIG. 16 represents a shift of temperature t of the cylindrical coil, a shift of on/off pulse of the pump, and a shift of temperature t of the cylindrical coil, a shift of on/off pulse of the pump during a period from start-up up to when 180 to 360 seconds has passed from then, in a case of the load torque T=0.42 Nm.

FIG. 16 is a result of a driving test of the coreless motor 10 in which the load torque $T_4$ is set to $T_4$=0.42 Nm with the variable load 33 of the electric generator 32. As apparent from FIG. 16(a), during the operation test of the coreless motor 10, the coreless motor 10 is operated such that the cylindrical coil 100 is maintained within a certain temperature range by the on/off pulse operation of the refrigerant liquid supply pump 22, with the torque $T_4$ maintained at 0.42 Nm. The temperature t of the cylindrical coil 100 exceeds the cooling start temperature ($t_{L1}$=123° C.) in around 40 seconds after start-up of the coreless motor 10. At this moment, the refrigerant liquid (pure water) 80 is directly supplied to the cylindrical coil 100. Then, when the cylindrical coil 100 is cooled by latent heat of vaporization and falls below the cooling stop temperature ($t_{L2}$=122° C.), the supply of the refrigerant liquid (pure water) 80 is stopped. With repetition of such pulse operation, the temperature t of the cylindrical coil shifts in a range between 107° C. and 127° C. which is the certain temperature range. FIG. 16(a) is what has excerpted a period from when the coreless motor 10 is started up to when 720 seconds (12 minutes) has passed in a continuous operation test, and we have confirmed that the temperature shift for a period from 720 seconds (12 minutes) onward is almost similar.

During the operation test of the coreless motor 10, a total pump operation time of 10 minutes from when the refrigerant liquid supply has started for the case of the torque $T_1$ is 56 seconds, on the other hand, it is 176.5 seconds for the case of the torque $T_4$. The supply amount of the refrigerant liquid during such period is 3.62 ml for the case of the torque $T_1$, on the other hand, it is 11.41 ml for the case of the torque $T_4$, and it is 3.2 times more compared with the case of the torque $T_1$ (FIGS. 11 and 12).

FIG. 16(b) is a diagram which has enlarged a temperature waveform of the cylindrical coil 100 of 3 minutes from when 180 seconds (3 minutes) has passed from the start-up up to when 360 seconds (6 minutes) has passed from the start-up, which is after cooling has started. A condition where rapid cooling is caused can be easily determined from the figure. The first read-in temperature $t_{L1}$ is 123° C., and when the cooling is started by supplying the refrigerant liquid 80 at a temperature t exceeding such temperature, the temperature increase due to overshoot is around 4° C., and then reversed. The second read-in temperature $t_{L2}$ after reverse is 122° C., and even when the supply of the refrigerant 80 is stopped at a temperature t which is below such temperature, the temperature after decrease further decreases by around 15° C. to 7° C. due to overshoot. Specifically, the maximum temperature $t_{c1}$=127° C., the minimum temperature $t_{c2}$=107° C., and $_\Delta t$=20° C., of the cylindrical coil under control, with the load torque set to $T_4$=0.42 Nm. A pulse interval becomes further shorter compared with the case for the torque $T_3$=0.39 Nm. We have confirmed that, a normal continuous operation is possible also for this case by controlling such that the temperature difference $_\Delta t$ between the maximum temperature $t_{c1}$ and the minimum temperature $t_{c2}$ of the cylindrical coil 100 under control comes narrow, under a condition where the temperature of the cylindrical coil 100 does not exceed the allowable maximum temperature $t_M$=130° C. and does not fall below the minimum temperature $t_N$ where the refrigerant liquid (pure water) vaporizes.

As apparent from FIGS. 13 to 16, we have confirmed that the continuous operation of the coreless motor 10 is possible by controlling the temperature of the cylindrical coil 100, with the load torque $T_1$ to $T_4$ (0.33 to 0.42 Nm) exceeding a rated torque $T_0$=0.28 Nm being continuously applied to the coreless motor 10. From these test results, in any of these cases of $T_1$ to $T_4$, it is confirmed that a normal continuous operation of the coreless motor 10 is possible by controlling the temperature of the cylindrical coil 100, in which the cylindrical coil 100 vaporizes the supplied refrigerant liquid (pure water) 80, and with the latent heat of vaporization, the temperature difference $_\Delta t$ between the maximum temperature $t_{c1}$ and the minimum temperature $t_{c2}$ of the cylindrical coil 100 comes narrow, under a condition where the temperature of the cylindrical coil 100 does not exceed the allowable maximum temperature $t_M$ and does not fall below the minimum temperature $t_N$ where the refrigerant liquid (pure water) vaporizes.

It is verified that the coreless motors 10 in each of the four cases under the overload condition is capable of being operated continuously with the cylindrical coil 100 being in a completely controlled state and within an appropriate temperature range such as, the maximum temperature $t_{c1}$=125° C., the minimum temperature $t_{c2}$=111° C., $_\Delta t$=14° C. ($T_1$), the maximum temperature $t_{c1}$=128° C., the minimum temperature $t_{c2}$=113° C., $_\Delta t$=15° C. ($T_2$), the maximum temperature $t_{c1}$=128° C., the minimum temperature $t_{c2}$=109° C., $_\Delta t$=19° C. ($T_3$), the maximum temperature $t_{c1}$=127° C., the minimum temperature $t_{c2}$=107° C., $_\Delta t$=20° C. ($T_4$), by adjusting the supply amount of the refrigerant liquid (pure water) 80 to the cylindrical coil 100.

Further driving test is performed to reinforce the verifications by the driving tests of the coreless motor 10 in each of the four cases under the overload condition. It is a test where the load torque is set to $T_1$=0.33 Nm, which is set by the variable load 33 of the electric generator 32, to drive the coreless motor 10 from start-up to when 300 seconds (5 minutes) passes, then the load torque is set to $T_4$=0.42 Nm for the next 300 seconds to 600 seconds (another 5 minutes) to drive the coreless motor 10, and the load torque is set to $T_1$=0.33 Nm again for the next 600 seconds to 720 seconds (further 2 minutes) to drive the coreless motor 10.

Figure 17:
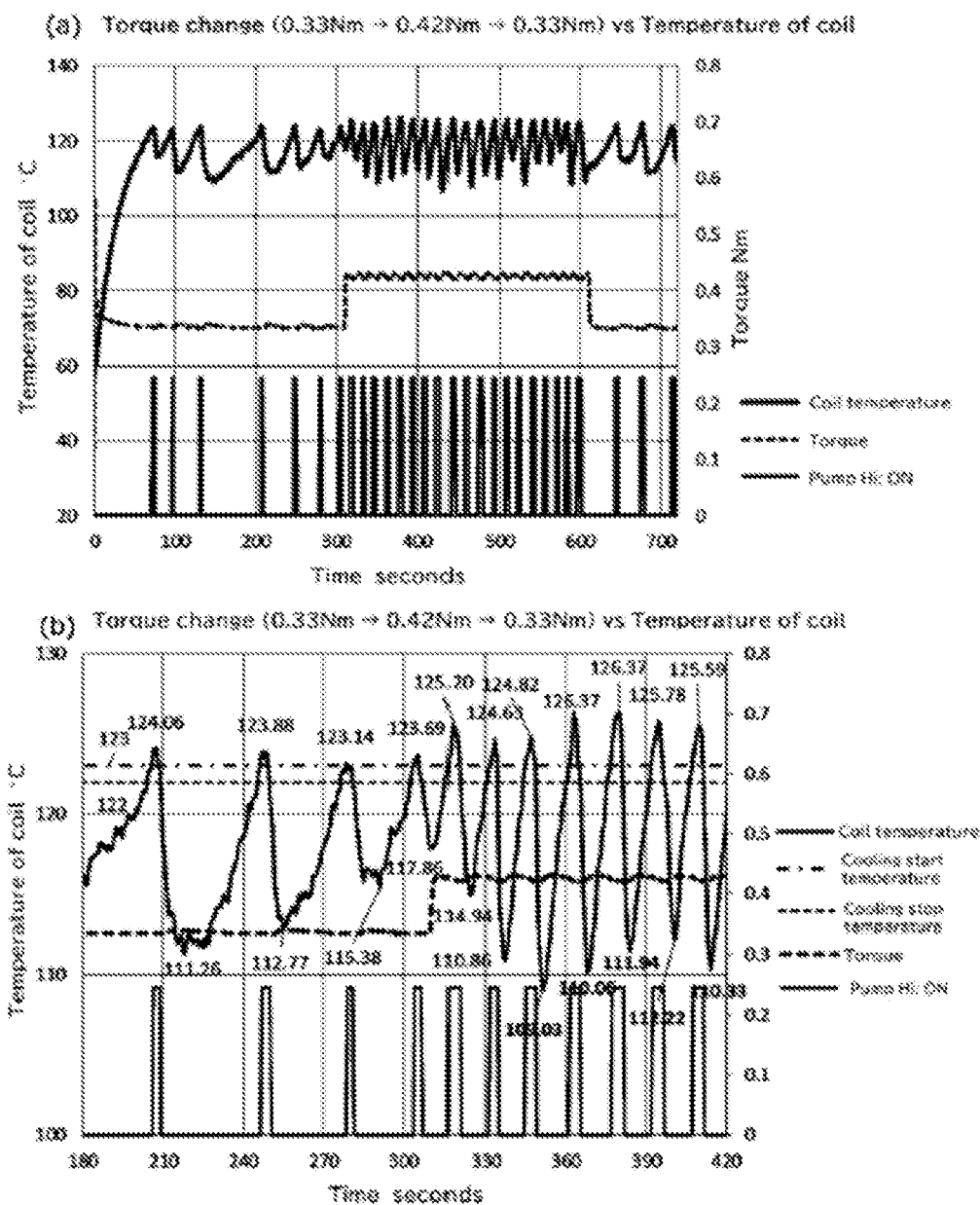
FIG. 17 represents a shift of temperature t of the cylindrical coil, a shift of on/off pulse of the pump, and a shift of temperature t of the coil and a shift of on/off pulse of the pump during a period from start-up up to when 180 to 420 seconds has passed from then, in a case where the load torque is changed as $T_1$=0.33 Nm (300 seconds), $T_4$=0.42 Nm (300 seconds) and then $T_1$=0.33 Nm (120 seconds).

FIG. 17 is a test result of the coreless motor 10 being continuously driven for 5 minutes with the torque $T_1$, 5 minutes with the torque $T_4$, and 2 minutes with the torque $T_1$ again. As apparent from FIG. 17(a), during the operation test of the coreless motor 10, the temperature t of the cylindrical coil shifts in a range between 109° C. and 126° C., which is the certain temperature range, even under a condition where the load torque is set to $T_1$=0.33 Nm to drive the coreless motor 10 from start-up up to when 300 minutes (5 minutes) passes, then the load torque is set to $T_4$=0.42 Nm for next 300 seconds to 600 seconds (another 5 minutes), with repetition of the on/off pulse operation of the refrigerant liquid supply pump 22. FIG. 17(a) is what has excerpted a period from when the coreless motor 10 is started up to when 720 seconds (12 minutes) has passed in a continuous operation test, and we have confirmed that the temperature shift for a period from 720 seconds (12 minutes) onward is almost similar.

The condition for the refrigerant liquid supply pump 22 to operate is when the cooling start (the first read-in) temperature $t_{L1}$=123° C. is exceeded as in the above cases. At this moment, the refrigerant liquid (pure water) 80 is directly supplied to the cylindrical coil. Then, when the cylindrical coil 100 is cooled by latent heat of vaporization and the temperature falls below the cooling stop (the second read-in) temperature $t_{L2}$=122° C., the supply of the refrigerant liquid (pure water) 80 is stopped.

FIG. 17(b) is a detail of a part where the load torque is instantaneously changed from $T_1$=0.33 Nm to $T_4$=0.42 Nm. Specifically, it is a diagram which has enlarged a temperature waveform of the cylindrical coil 100 of 4 minutes from when 180 seconds (3 minutes) has passed from the start-up up to when 420 seconds (7 minutes) has passed from the start-up. More specifically, since the load torque $T_1$ is 0.33 Nm from 180 seconds (3 minutes) to 300 seconds (5 minutes), rapid cooling and slow temperature increase can be easily determined from the figure. The first read-in temperature $t_{L1}$ is 123° C., and when the refrigerant liquid 80 is supplied to start cooling at a temperature t exceeding such temperature, the temperature increase is within around 1° C. and then reversed. The second read-in temperature $t_{L2}$ after reverse is 122° C., and even when the supply of the refrigerant 80 is stopped at a temperature t below such temperature, the temperature after decrease further decreases by around 11° C. to 7° C. due to overshoot. Specifically, the maximum temperature $t_{c1}$=124° C., the minimum temperature $t_{c2}$=111° C., and $_\Delta t$=13° C. of the cylindrical coil of 2 minutes from when 180 seconds (3 minutes) has passed from the start-up up to when 300 seconds (5 minutes) has passed from the start-up, with the load torque set to $T_1$=0.33 Nm, which almost corresponds with the result of FIG. 13, where the maximum temperature $t_{c1}$=125° C., the minimum temperature $t_{c2}$=111° C., and $_\Delta t$=14° C.

Since the load torque $T_4$ is 0.42 Nm from 300 seconds (5 minutes) to 420 seconds (7 minutes), rapid cooling and rapid increase of temperature can be easily determined from the figure. The first read-in temperature $t_{L1}$ is 123° C., and when the refrigerant liquid 80 is supplied to start cooling at a temperature t exceeding such temperature, the temperature increase is within around 4° C. and then reversed. The second read-in temperature $t_{L2}$ after reverse is 122° C., and even when the supply of the refrigerant 80 is stopped at a temperature t below such temperature, the temperature after decrease further decreases by around 13° C. to 10° C. due to overshoot. Specifically, the maximum temperature $t_{c1}$=126° C., the minimum temperature $t_{c2}$=109° C., and $_\Delta t$=17° C. of the cylindrical coil of 2 minutes from 300 seconds (5 minutes) to 420 seconds (7 minutes), with the load torque set to $T_4$=0.42 Nm, which almost corresponds with the result of FIG. 16, where the maximum temperature $t_{c1}$=127° C., the minimum temperature $t_{c2}$=108° C., and $_\Delta t$=19° C. It is thereby confirmed that, even under a load change during operation of the coreless motor 10 where the torque 0.42 Nm is the maximum, it is capable of being appropriately controlled for continuous operation.

Figure 18:
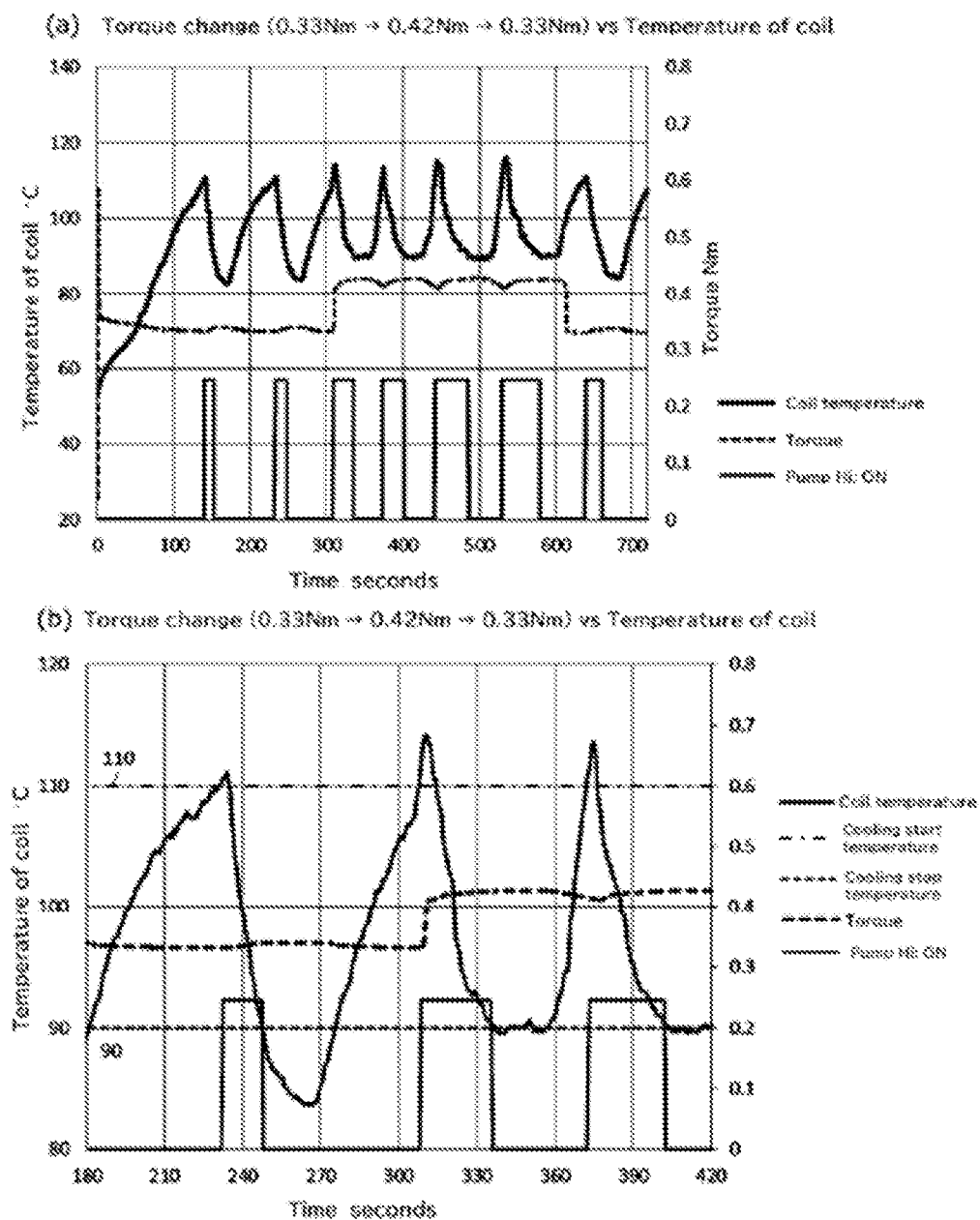
FIG. 18 represents a shift of temperature t, a shift of on/off pulse of the pump, and a shift of temperature t of the coil and a shift of on/off pulse of the pump during a period from start-up up to when 180 to 420 seconds has passed from then, in a case where the measured motor (CP50), of which load torque is changed as shown in FIG. 17, is set such that a supply start temperature $t_{L1}$ of refrigerant liquid is 110° C. (the refrigerant liquid is supplied at a temperature t exceeding such temperature), and a supply stop temperature of refrigerant liquid $t_{L2}$ is 90° C. (the supply of the refrigerant liquid is stopped at a temperature t which falls below such temperature).

FIG. 18 is an experiment result when the cooling start temperature $t_{L1}$ and the cooling stop temperature $t_{L2}$ of the cylindrical coil 100 are changed, with the condition of the torques being identical as shown in FIG. 17. It is a test result of the coreless motor 10 in which, the coreless motor 10 is started, the cooling start temperature is set when the temperature of the cylindrical coil 100 is $t_{L1}$=110° C., the cooling stop temperature is set when the temperature of the cylindrical coil 100 is $t_{L2}$=90° C., and continuously driven for 5 minutes with the torque $T_1$, 5 minutes with the torque $T_4$, and 2 minutes with the torque $T_1$ again. In a case where set values of the cooling start temperature $t_{L1}$ and the cooling stop temperature $t_{L2}$ are changed, it is confirmed that the driving system 1 can also operate normally.

Figures 19, 20:
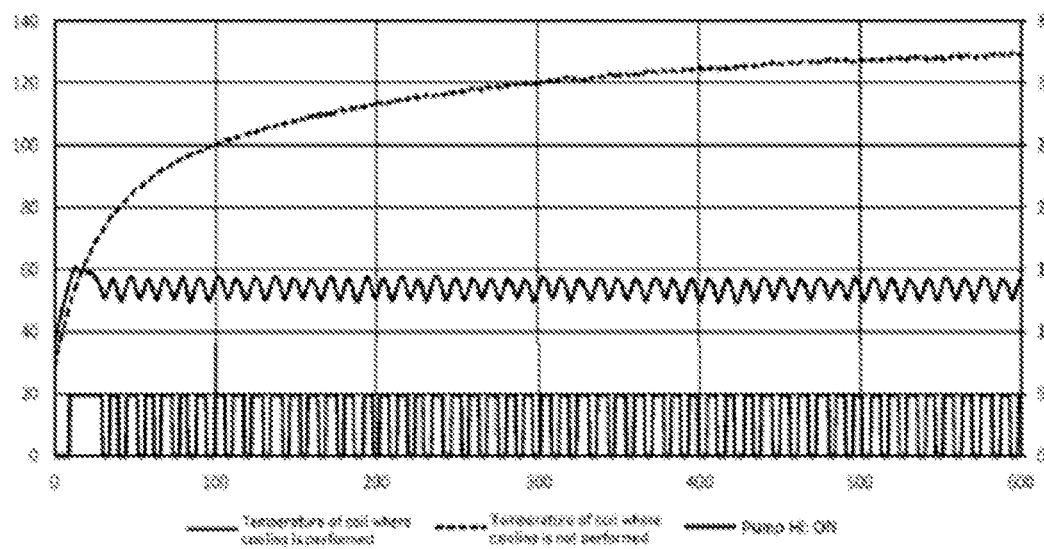
FIG. 19 is a list of melting temperature ° C., boiling temperature ° C., vaporization heat kJ/kg of representative refrigerant liquids.
FIG. 20 represents a shift of temperature t of the cylindrical coil in a driving test using the measure motor (CP50) in which a fluorinated refrigerant is used with load torque T=0.317 Nm, with respect to each of cases where cooling is performed and where cooling is not performed.

The driving tests in the above are performed using pure water of vaporization heat 2257 kJ/kg described in a table of FIG. 19 as the refrigerant liquid. FIG. 19 is a list for melting temperature C, boiling temperature C, vaporization heat kJ/kg of the refrigerant liquid including pure water 80. Here, a driving test is performed respectively for a case with and without the refrigerant, where a fluorinated liquid, with melting temperature −123° C., boiling temperature 34° C. and vaporization heat 142 kJ/kg, is used as the refrigerant liquid 80, and the coreless motor 10, with the load torque set to T=0.317 Nm, is used.

FIG. 20 represents a respective shift of temperature t of the cylindrical coil 100 in a driving test which uses a fluorinated refrigerant liquid as the refrigerant 80, for a case where the refrigerant liquid supply pump 22 is driven with the refrigerant liquid 80 being supplied to the cylindrical coil 100 and a case without the supply thereof, and the operation condition of the refrigerant liquid supply pump 22 is set such that the cooling start temperature $t_{L1}$=54° C. (the first read-in) and the cooling stop temperature $t_{L2}$=52° C. (the second read-in). By this driving test, it is confirmed that, in the operated coreless motor 10, in a case where the fluorinated refrigerant liquid 80 is supplied, the temperature of cylindrical coil 100 may be shifted between 50° C. to 60° C., on the other hand, in a case where the fluorinated refrigerant liquid 80 is not supplied, the temperature of the cylindrical coil 100 exceeds 130° C. in about 10 minutes.

The result of the driving test revealed that the cooling operation to the cylindrical coil 100 by latent heat of vaporization, in which the fluorinated refrigerant liquid 80 is supplied to the cylindrical coil 100 and be vaporized with cylindrical coil 100, is also appropriately controlled by the controlling device 20. It is also verified that, in the coreless motor 10 which uses the refrigerant liquid 80 other than pure water, if the cooling operation to the cylindrical coil 100 can be appropriately controlled, the continuous operation of the coreless motor 10 is possible, and it is confirmed that change of the refrigerant allows change of temperature control range of the coil.

As apparent from the present driving test using the coreless motor 10 of FIG. 8, the present invention is a coreless rotating electrical machine for being operated under a load exceeding a rated load, a driving method thereof, and a driving system including thereof, which at least has the following configurations.

The coreless rotating electrical machine typically has a rotor equipped with a plurality of magnets on an inner surface of a cylindrical mount, or a rotor in which a plurality of magnets are equipped with intervals with respect to each other in a circumferential direction on an outer surface of an inner yoke and/or an inner surface of an outer yoke of a cup-type mount to which the concentric inner yoke and the outer yoke are integrated, and provided with slits, each of which passing through the inner yoke, at positions of the inner yoke corresponding to each of the intervals, or either of them as a constituent requirement, and a stator, which is the other constituent requirement corresponding to the rotor, has an energizable coreless cylindrical coil and consists of a lid-type mount which fixes one of end faces of the cylindrical coil.

Figure 5:
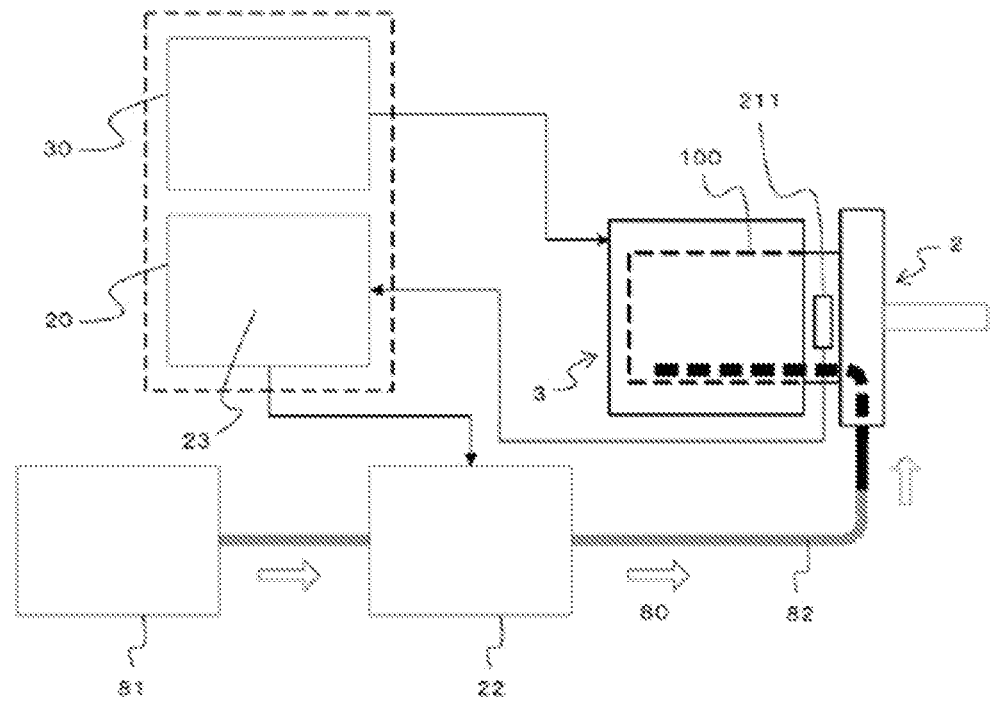
FIG. 5 is a schematic diagram representing the coreless rotating electrical machine, a driving method thereof, and a driving system including thereof, comprising a controlling part or controlling device, for controlling flow volume of a refrigerant liquid by a pump, equipped in relation to the stator, and a driving part or driving device equipped in relation to the rotor, of the coreless rotating electrical machine shown in FIG. 1 or 3.
Figure 6:
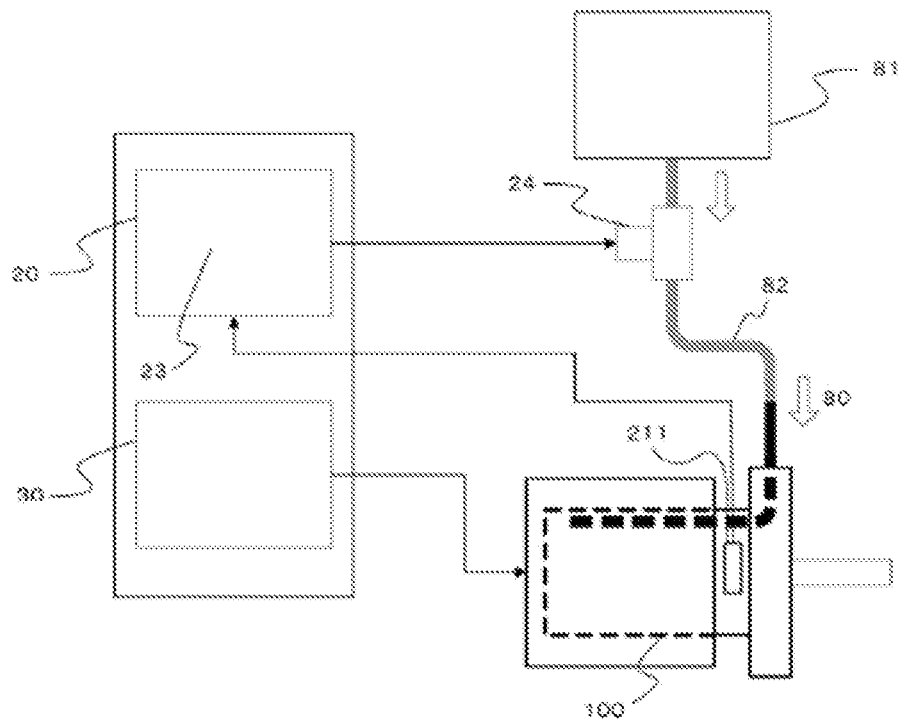
FIG. 6 is a schematic diagram representing the coreless rotating electrical machine, a driving method thereof, and a driving system including thereof, comprising a controlling part or controlling device, for controlling flow volume of a refrigerant liquid by an electromagnetic valve, equipped in relation to the stator, and a driving part or driving device equipped in relation to the rotor, of the coreless rotating electrical machine shown in FIG. 1 or 3.

As apparent from FIGS. 1, 2 and FIGS. 3 and 4, it further has a channel for supplying a refrigerant liquid to an air space formed by an inner side of the cylindrical coil fixed to the stator and a center part of the rotor and the stator, and has a configuration in which a controlling part or controlling device is activated when driven by a driving part or driving device to adjust a supply amount of the refrigerant to be directly fed to the inner surface of the cylindrical coil via the channel by properly detecting a temperature of the cylindrical coil which generates heat. This is what can be easily understood from FIGS. 5 and 6 which represent the driving system.

It is easily estimated from the variable load 33 in the electric generator 32 of FIG. 7, which is a schematic diagram of a driving test, that the coreless rotating electric machine, the driving method thereof, and the driving system including thereof of the present invention are applicable to various load conditions exceeding a rating. Moreover, the size does not matter as long as a configuration thereof is the same as that of the coreless motor used for the driving test.

Figure 3:
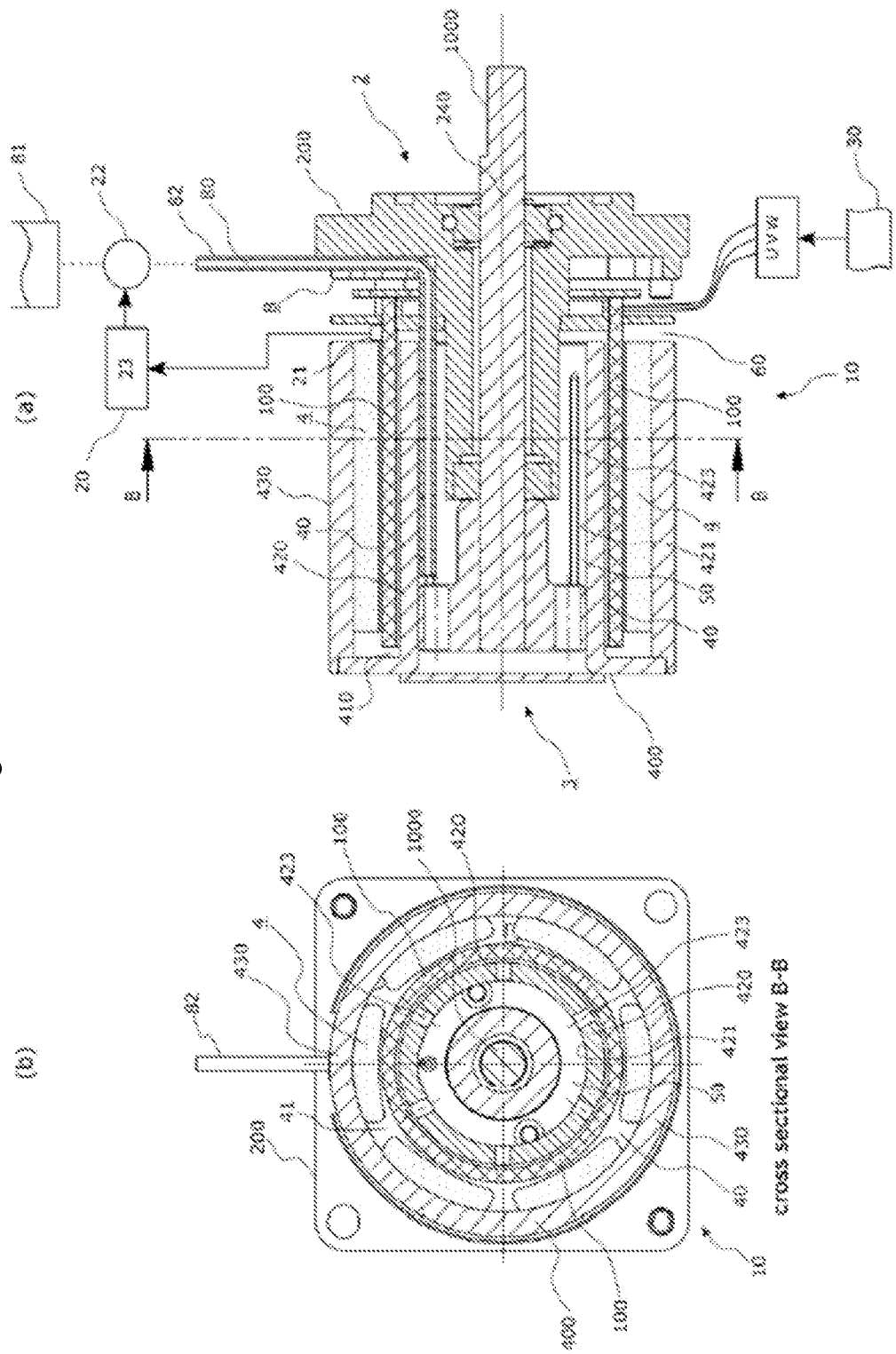
FIG. 3 is a cross sectional schematic diagram of a coreless rotating electrical machine comprising a rotor consisting of a cup-type mount opposingly and rotatably positioned with respect to a stator consisting of a lid-type mount including a cylindrical coil, which is another embodiment of the present invention.
Figure 4:
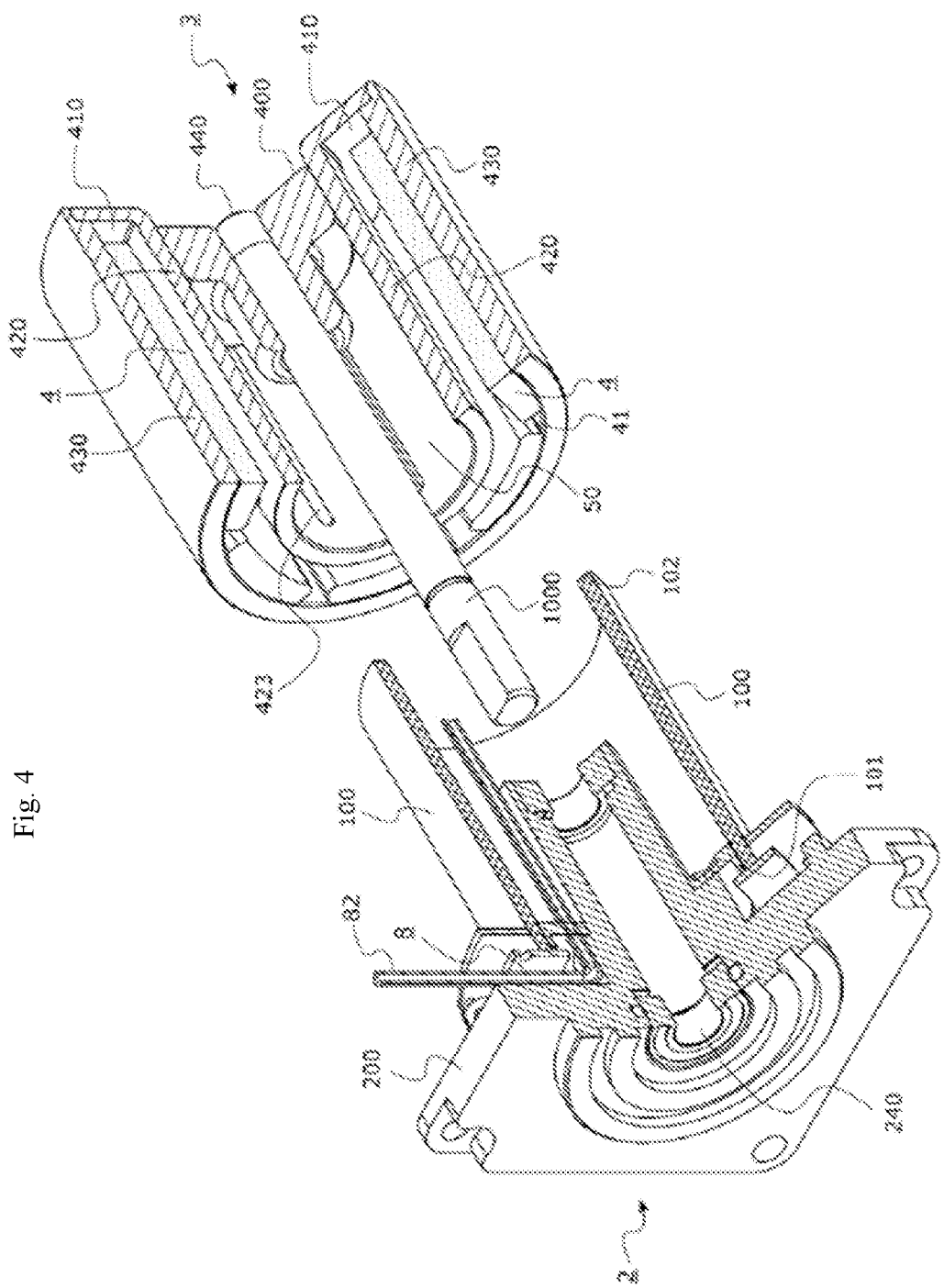
FIG. 4 is a perspective diagram of a partially cutout coreless rotating electrical machine shown in FIG. 3.
Figure 21:
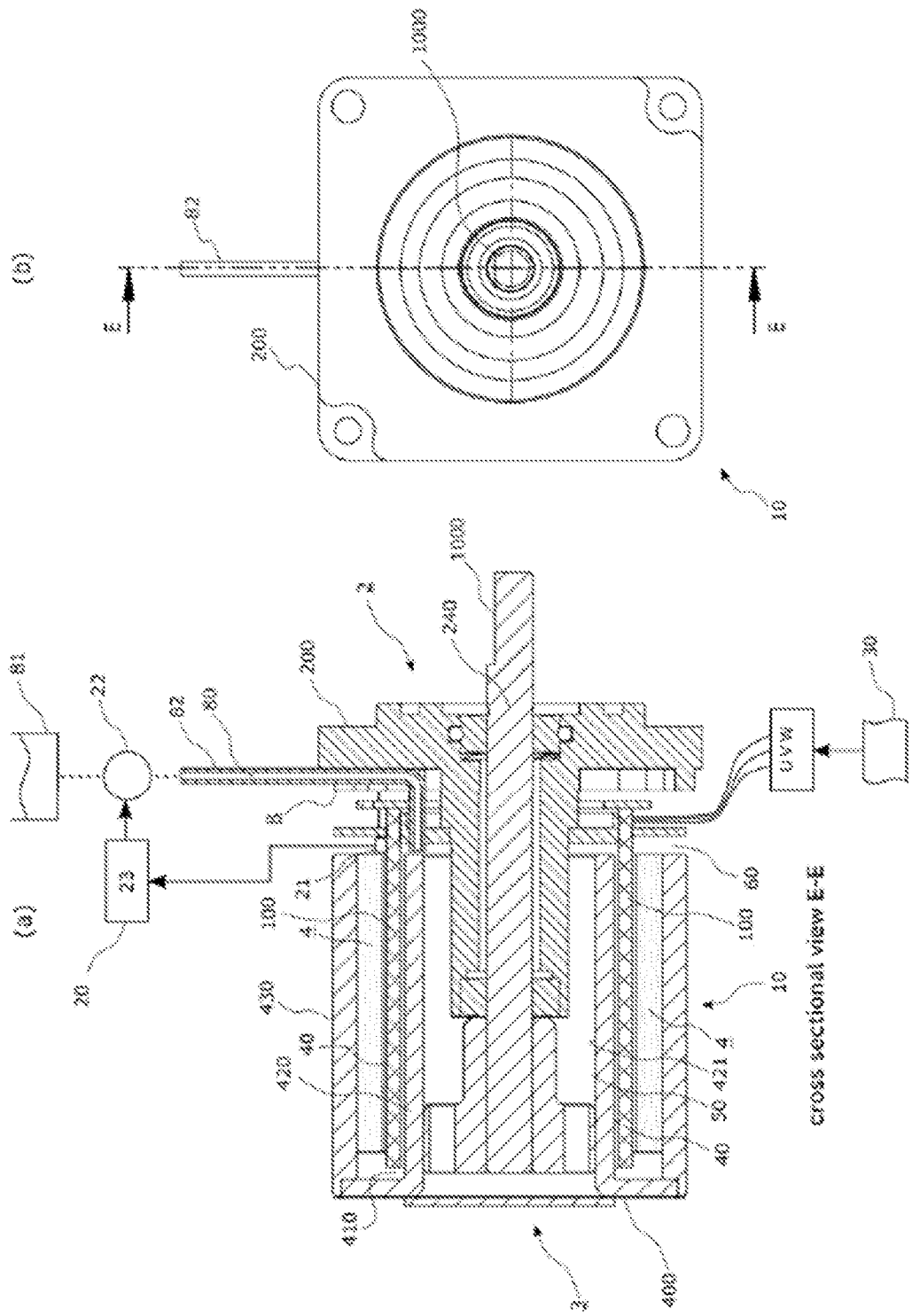
FIG. 21 (Reference diagram) is a coreless rotating electric machine having a configuration in which a refrigerant liquid is supplied only to a second air space of the coreless rotating electrical machine.

The coreless rotating electric machine of FIG. 21 illustrated as a reference diagram is an example in which a configuration of supplying a refrigerant liquid is arranged in a second air space, instead of a first air space shown in FIGS. 3 and 4 which is the position where the refrigerant liquid is supplied. Also in this example, the refrigerant liquid fed to the second air space reaches the cylindrical coil, which generates heat, and vaporized, and the cooling of the cylindrical coil by the latent heat of vaporization is fully possible, and thus, we consider that it may be the coreless rotating electrical machine for being operated under the load exceeding the rating. However, the driving test of the coreless motor based on such configuration has not been performed.

Although the present invention has been described for preferable embodiments, those skilled in the art may understand that various modifications may be made and elements may be replaced with equivalents without departing the scope of the present invention. Therefore, the present invention should not be limited to specific embodiments disclosed as the best mode of embodiments considered for implementing the present invention, and it Although the present invention has been described for preferable embodiments, those skilled in the art may understand that various modifications may be made and elements may be replaced with equivalents without departing the scope of the present invention. Therefore, the present invention should not be limited to specific embodiments disclosed as the best mode of embodiments considered for implementing the present invention, and the present invention encompasses all embodiments which belong to claims.

REFERENCE SIGNS LIST

1: Driving system
2: Stator
3: Rotor
4: Magnet
8: Channel for supplying refrigerant liquid
10: Coreless rotating electrical machine or coreless motor
20: Controlling part or controlling device
21: Coil temperature detecting sensor
22: Pump
23: Controller
24: Electromagnetic valve
25: Temperature and voltage recording device
26: Refrigerant liquid flow volume varying device
30: Driving part or driving device
31: Power meter
32: Electric generator
33: Variable load
34: Torque sensor
35: Torque meter
40: Air space or first air space including air gap
41: Gap between respective magnets
50: Second air space
60: Third air space
80: Refrigerant liquid or liquid phase
800: Gas phase of refrigerant liquid
81: Refrigerant liquid container
82: Circulating means or circulating and conveying pipe
100: Cylindrical coil
101: One of end faces of cylindrical coil
102: The other end face of cylindrical coil
110: Inner periphery side of cylindrical coil
120: Outer periphery side of cylindrical coil
200: Lid-type mount included in stator 2
240: Center part of lid-type mount
300: Cylindrical mount included in rotor 3
310: Inner surface of cylindrical mount
340: Center part of cylindrical mount
400: Cup-type mount included in rotor 3
401: One of end faces of cup-type mount
410: Bottom part of cup-type mount
420: Inner yoke included in cup-type mount 400
421: Inside of inner yoke 420
422: Outer surface of inner yoke
423: Slits which pass through inner yoke 420
430: Outer yoke included in cup-type mount 400
431: Inner surface of outer yoke
1000: Drive shaft

The invention claimed is:
1. A coreless rotating electrical machine to be operated continuously, comprising:
a stator including an energizable coreless cylindrical coil and a lid-type mount which fixes an end face of the cylindrical coil; and a rotor including a cup-type mount opposingly and rotatably positioned with respect to the lid-type mount, wherein:

an air gap is formed between the lid-type mount and the cup-type mount, the cup-type mount is equipped with magnets, wherein:

an outer surface of each of the magnets is faced to an inner surface of the cylindrical coil within the air gap, an inner surface of each of the magnets is faced to an outer surface of the cylindrical coil within the air gap, or an outer surface of each magnet of a first group of the magnets is faced to an inner surface of the cylindrical coil within the air gap and an inner surface of each magnet of a second group of the magnets is faced to an outer surface of the cylindrical coil within the air gap, the lid-type mount is equipped with a channel for supplying a refrigerant liquid to the air gap; and a controlling part which controls supply of the refrigerant liquid and a driving part which drives the rotor are equipped therewith, wherein, the coreless rotating electrical machine is to be operated continuously by activating the driving part, activating the controlling part, supplying the refrigerant liquid into the air gap, allowing the cylindrical coil, which generates heat, to vaporize the refrigerant liquid, cooling the cylindrical coil by latent heat of vaporization of the refrigerant liquid, and repeating:

an operation of supplying the refrigerant liquid to prevent a temperature of the cylindrical coil exceeding an allowable maximum temperature for a rated operation; and an operation of adjusting the supply of the refrigerant liquid to limit a flow volume of the refrigerant liquid to heat the cylindrical coil so as to prevent the temperature of the cylindrical coil falling below a minimum temperature where the cylindrical coil vaporizes the refrigerant liquid, so as to maintain the temperature of the cylindrical coil in a range between the allowable maximum temperature and the minimum temperature, which enables the coreless rotating electrical machine to be operated continuously.

2. The coreless rotating electrical machine as defined in claim 1, wherein the refrigerant liquid is water.

3. The coreless rotating electrical machine as defined in claim 1, wherein the cylindrical coil is formed from a laminate of electrically conductive metal sheets having linear parts being spaced in an axial direction covered with insulating layers formed to a cylindrical form.

4. The coreless rotating electrical machine as defined in claim 1, wherein the cylindrical coil is formed from a linear conductor covered with an insulating layer formed to a cylindrical form.

5. The coreless rotating electrical machine as defined in claim 1, wherein the rotor further includes a drive shaft fixed to a center part of the cup-type mount and rotatably coupled to a center part of the lid-type mount.

* * * * *